United States Patent
Kimura et al.

(10) Patent No.: US 8,359,155 B2
(45) Date of Patent: Jan. 22, 2013

(54) VEHICLE DRIVING OPERATION SUPPORT APPARATUS/METHOD AND VEHICLE

(75) Inventors: Takeshi Kimura, Yokohama (JP); Genpei Naito, Yokohama (JP); Tomohiro Yamamura, Yokohama (JP); Satoshi Tange, Fujisawa (JP); Taku Suzuki, Isehara (JP); Yosuke Kobayashi, Yokohama (JP); Toshiyuki Murata, Zama (JP); Tomoyuki Kashiwaya, Ebina (JP); Yuya Takeda, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 179 days.

(21) Appl. No.: 12/710,504

(22) Filed: Feb. 23, 2010

(65) Prior Publication Data
US 2010/0222965 A1 Sep. 2, 2010

(30) Foreign Application Priority Data
Feb. 27, 2009 (JP) ................................. 2009-046944

(51) Int. Cl.
*F41G 9/00* (2006.01)
*G06F 7/00* (2006.01)
*G06F 7/70* (2006.01)
*G06F 17/10* (2006.01)
*B60T 7/12* (2006.01)
*B60T 7/16* (2006.01)
*G05D 1/02* (2006.01)
*B60Q 1/00* (2006.01)
*G08G 1/16* (2006.01)
*B60K 31/00* (2006.01)

(52) U.S. Cl. .............. 701/302; 701/65; 701/70; 701/96; 701/300; 701/301; 340/435; 340/436; 340/903; 180/167; 180/168; 180/169; 180/170

(58) Field of Classification Search ................ 701/1, 29, 701/36, 41, 65, 70, 96, 300–302; 340/576, 340/435, 436, 903; 180/167–170
See application file for complete search history.

(56) References Cited

U.S. PATENT DOCUMENTS
5,347,457 A 9/1994 Tanaka et al.
(Continued)

FOREIGN PATENT DOCUMENTS
DE 102005024382 A1 12/2006
(Continued)

OTHER PUBLICATIONS
U.S. Appl. No. 12/710,513, filed Feb. 23, 2010, Yosuke Kobayashi et al.
(Continued)

*Primary Examiner* — James Trammell
*Assistant Examiner* — Majdi Alsomiri
(74) *Attorney, Agent, or Firm* — Foley & Lardner LLP

(57) ABSTRACT

A motor vehicle includes a vehicle driving operation support system. The vehicle driving operation support system senses an environment surrounding the motor vehicle; senses a traveling condition of the motor vehicle; calculates a risk potential of the motor vehicle on a basis of the sensed environment and the sensed traveling condition; controls the motor vehicle on a basis of a control setpoint. The vehicle driving operation support system sets on a basis of the calculated risk potential the control setpoint to a provisional setpoint effective for reducing the risk potential; senses driver's operation in reaction to the controlling operation with the control setpoint set to the provisional setpoint; and sets the control setpoint to a normal setpoint on a basis of the sensed driver's operation.

12 Claims, 12 Drawing Sheets

U.S. PATENT DOCUMENTS

| | | | |
|---|---|---|---|
| 6,917,872 B2 * | 7/2005 | Egami | 701/96 |
| 6,982,647 B2 * | 1/2006 | Kuge et al. | 340/576 |
| 7,006,917 B2 * | 2/2006 | Hijikata | 701/301 |
| 7,085,633 B2 * | 8/2006 | Nishira et al. | 701/36 |
| 7,136,755 B2 * | 11/2006 | Yamamura | 701/301 |
| 7,155,342 B2 * | 12/2006 | Kobayashi et al. | 701/301 |
| 7,167,798 B2 * | 1/2007 | Kondoh et al. | 701/301 |
| 7,403,842 B2 * | 7/2008 | Yamamura et al. | 701/1 |
| 7,457,694 B2 | 11/2008 | Hijikata | |
| 2002/0103587 A1 | 8/2002 | Kim | |
| 2004/0080405 A1 | 4/2004 | Hijikata | |
| 2005/0049761 A1 | 3/2005 | Kataoka et al. | |
| 2005/0065687 A1 * | 3/2005 | Hijikata et al. | 701/41 |
| 2006/0131093 A1 | 6/2006 | Egami | |
| 2007/0192030 A1 | 8/2007 | Tanimichi et al. | |
| 2007/0219695 A1 | 9/2007 | Chiu et al. | |
| 2007/0276577 A1 | 11/2007 | Kuge et al. | |
| 2009/0024279 A1 * | 1/2009 | Takeda et al. | 701/41 |
| 2009/0222170 A1 | 9/2009 | Scherl et al. | |

FOREIGN PATENT DOCUMENTS

| | | |
|---|---|---|
| EP | 1400435 A2 | 3/2004 |
| EP | 1757507 A1 | 2/2007 |
| JP | 10-211886 A | 8/1998 |
| JP | 2008-162554 A | 7/2008 |

OTHER PUBLICATIONS

U.S. Appl. No. 12/710,523, filed Feb. 23, 2010, Toshiyuki Murata et al.

U.S. Appl. No. 12/710,529, filed Feb. 23, 2010, Tomoaki Oida et al.

USPTO Office Action, U.S. Appl. No. 12/710,529, May 8, 2012, 18 pages.

USPTO Office Action, U.S. Appl. No. 12/710,513, Dec. 22, 2011, 18 pages.

USPTO Office Action, U.S. Appl. No. 12/710,523, Aug. 29, 2012, 12 pages (with copies of 2005/0090984, 2007/0272464, 7,831,314).

USPTO Notice of Allowance, U.S. Appl. No. 12/710,513, Oct. 23, 2012, 10 pages.

USPTO Notice of Allowance, U.S. Appl. No. 12/710,529, Oct. 1, 2012, 5 pages.

* cited by examiner

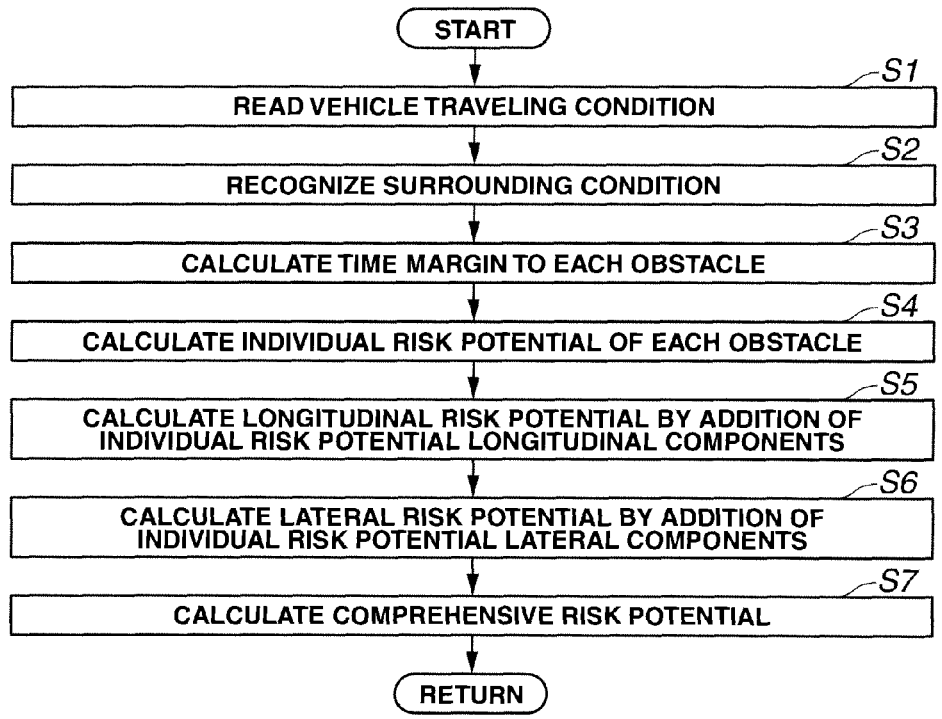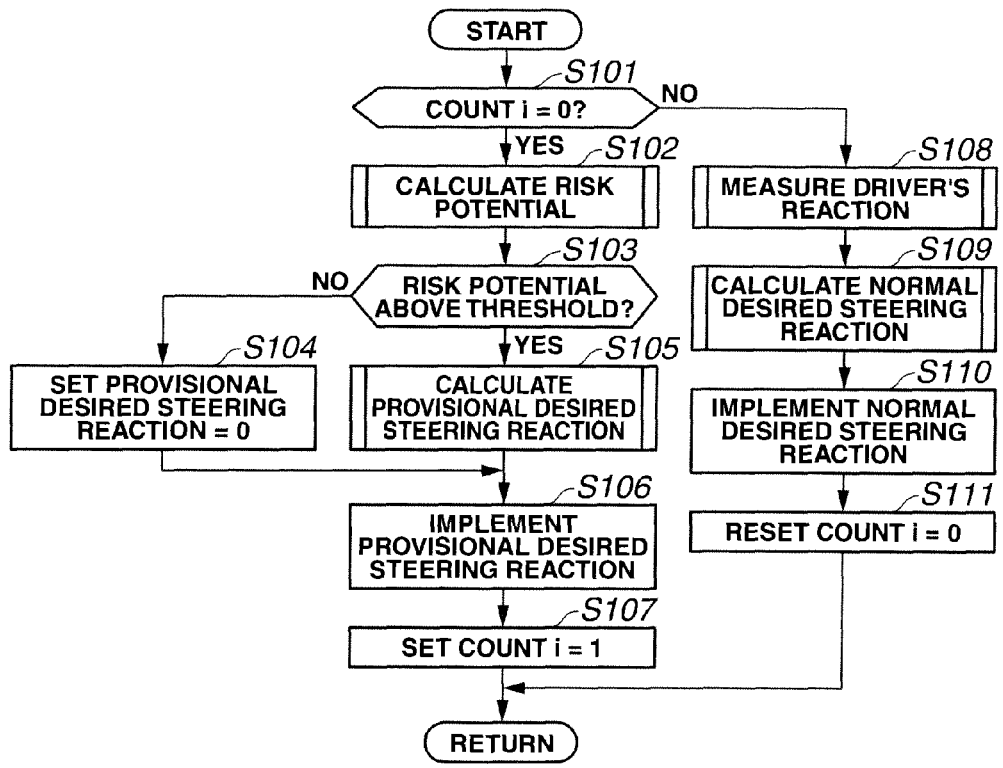

Fs: PROVISIONAL DESIRED STEERING REACTION
Fp: NORMAL DESIRED STEERING REACTION $$RP = \frac{1}{Y}$$

Fs: PROVISIONAL DESIRED STEERING REACTION
Fp: NORMAL DESIRED STEERING REACTION

VEHICLE DRIVING OPERATION SUPPORT APPARATUS/METHOD AND VEHICLE

BACKGROUND OF THE INVENTION

The present invention relates to an apparatus and method for supporting or assisting a driver in operating a vehicle, and a vehicle implementing the method.

Japanese Patent Application Publication No. 10-211886 discloses a technique for sensing an environment (obstacles) surrounding a vehicle, evaluating a risk potential on a basis of the sensed environment, and controlling steering assist torque on a basis of the evaluated risk potential, in order to allow a driver to recognize the environment, and suitably operate the vehicle.

SUMMARY OF THE INVENTION

It is possible that with the technique according to Japanese Patent Application Publication No. 10-211886, the controlled steering assist torque conflicts with driver's intention. For example, situations are possible where the driver is trying to perform steering operation with clear intention, but the steering assist torque is controlled to produce steering reaction torque to impede the driver's steering operation in conflict with driver's intention.

In view of the foregoing, it is desirable to provide an apparatus and method capable of supporting or assisting a driver in operating a vehicle in conformance with driver's intention, and a vehicle implementing the method.

According to one aspect of the present invention, a vehicle driving operation support apparatus comprises: an environment sensing section configured to sense an environment surrounding a vehicle; a traveling condition sensing section configured to sense a traveling condition of the vehicle; a vehicle control section configured to control the vehicle on a basis of a control setpoint; a provisional control setpoint setting section configured to: calculate a risk potential of the vehicle on a basis of the sensed environment and the sensed traveling condition; and set on a basis of the calculated risk potential the control setpoint to a provisional setpoint effective for reducing the risk potential; a driver's reaction sensing section configured to sense driver's operation in reaction to the controlling operation of the vehicle control section with the control setpoint set to the provisional setpoint; and a normal control setpoint setting section configured to set the control setpoint to a normal setpoint on a basis of the sensed driver's operation.

According to another aspect of the present invention, a vehicle driving operation support apparatus comprises: environment sensing means for sensing an environment surrounding a vehicle; traveling condition sensing means for sensing a traveling condition of the vehicle; vehicle control means for controlling the vehicle on a basis of a control setpoint; provisional control setpoint setting means for: calculating a risk potential of the vehicle on a basis of the sensed environment and the sensed traveling condition; and setting on a basis of the calculated risk potential the control setpoint to a provisional setpoint effective for reducing the risk potential; driver's reaction sensing means for sensing driver's operation in reaction to the controlling operation of the vehicle control means with the control setpoint set to the provisional setpoint; and normal control setpoint setting means for setting the control setpoint to a normal setpoint on a basis of the sensed driver's operation.

According to a further aspect of the present invention, a motor vehicle comprises: an environment sensing section configured to sense an environment surrounding the motor vehicle; a traveling condition sensing section configured to sense a traveling condition of the motor vehicle; a vehicle control section configured to control the motor vehicle on a basis of a control setpoint; a provisional control setpoint setting section configured to: calculate a risk potential of the motor vehicle on a basis of the sensed environment and the sensed traveling condition; and set on a basis of the calculated risk potential the control setpoint to a provisional setpoint effective for reducing the risk potential; a driver's reaction sensing section configured to sense driver's operation in reaction to the controlling operation of the vehicle control section with the control setpoint set to the provisional setpoint; and a normal control setpoint setting section configured to set the control setpoint to a normal setpoint on a basis of the sensed driver's operation.

According to a still further aspect of the present invention, a vehicle driving operation support method comprises: performing a vehicle control operation for vehicle driving operation support with a control setpoint set to a provisional setpoint; calculating a correction on a basis of driver's operation in reaction to the vehicle control operation with the control setpoint set to the provisional setpoint; and performing the vehicle control operation with the control setpoint set to a normal setpoint as a sum of the provisional setpoint and the correction.

BRIEF DESCRIPTION OF THE DRAWINGS

FIG. 5 is a flow chart showing a process of calculating a risk potential, which is performed by a controller of the vehicle driving operation support system.

FIG. 6 is a flow chart showing a process of steering operation support, which is performed by the controller.

DETAILED DESCRIPTION OF THE INVENTION

First Embodiment

Figure 1:
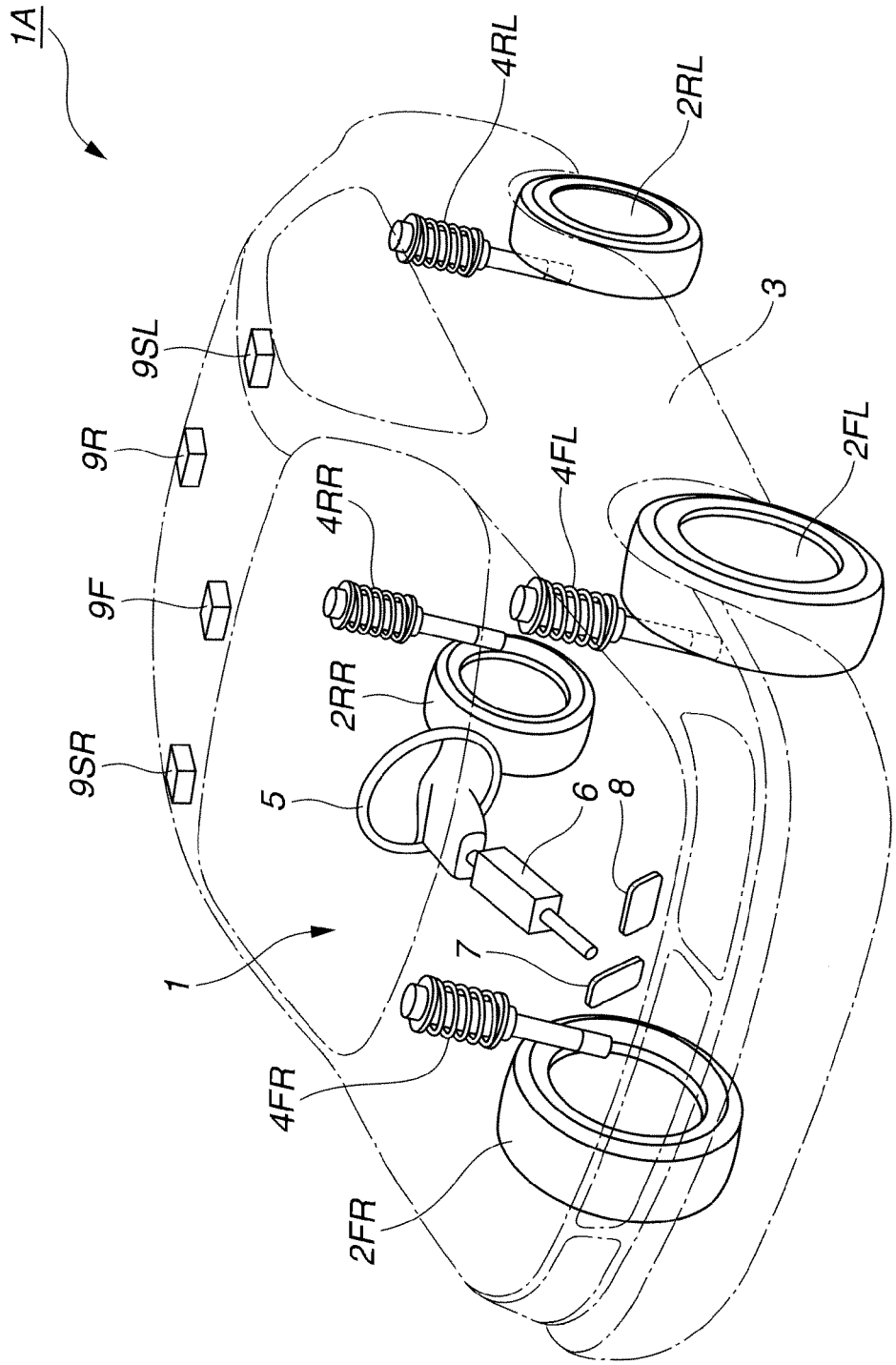
FIG. 1 is a schematic diagram showing a motor vehicle equipped with a vehicle driving operation support apparatus or system according to a first embodiment of the present invention.

FIG. 1 schematically shows a motor vehicle 1A equipped with a vehicle driving operation support apparatus or system 1 according to a first embodiment of the present invention. Motor vehicle 1A includes: wheels 2FR, 2FL, 2RR and 2RL; a vehicle body 3; an active suspension system including active suspensions 4FR, 4FL, 4RR and 4RL disposed between vehicle body 3 and wheels 2FR, 2FL, 2RR and 2RL, respectively; a steering wheel 5; a steering linkage 6 disposed between steering wheel 5 and steerable wheels 2FR and 2FL; an accelerator pedal 7; a brake pedal 8; and a cameral system including cameras 9F, 9R, 9SR and 9SL disposed, respectively, in front, rear, right and left parts of vehicle body 3, and arranged to monitor an environment surrounding the vehicle 1A by taking imagery. A controller 50 collects information by receiving signals from various components mounted on motor vehicle 1A.

Figure 2:
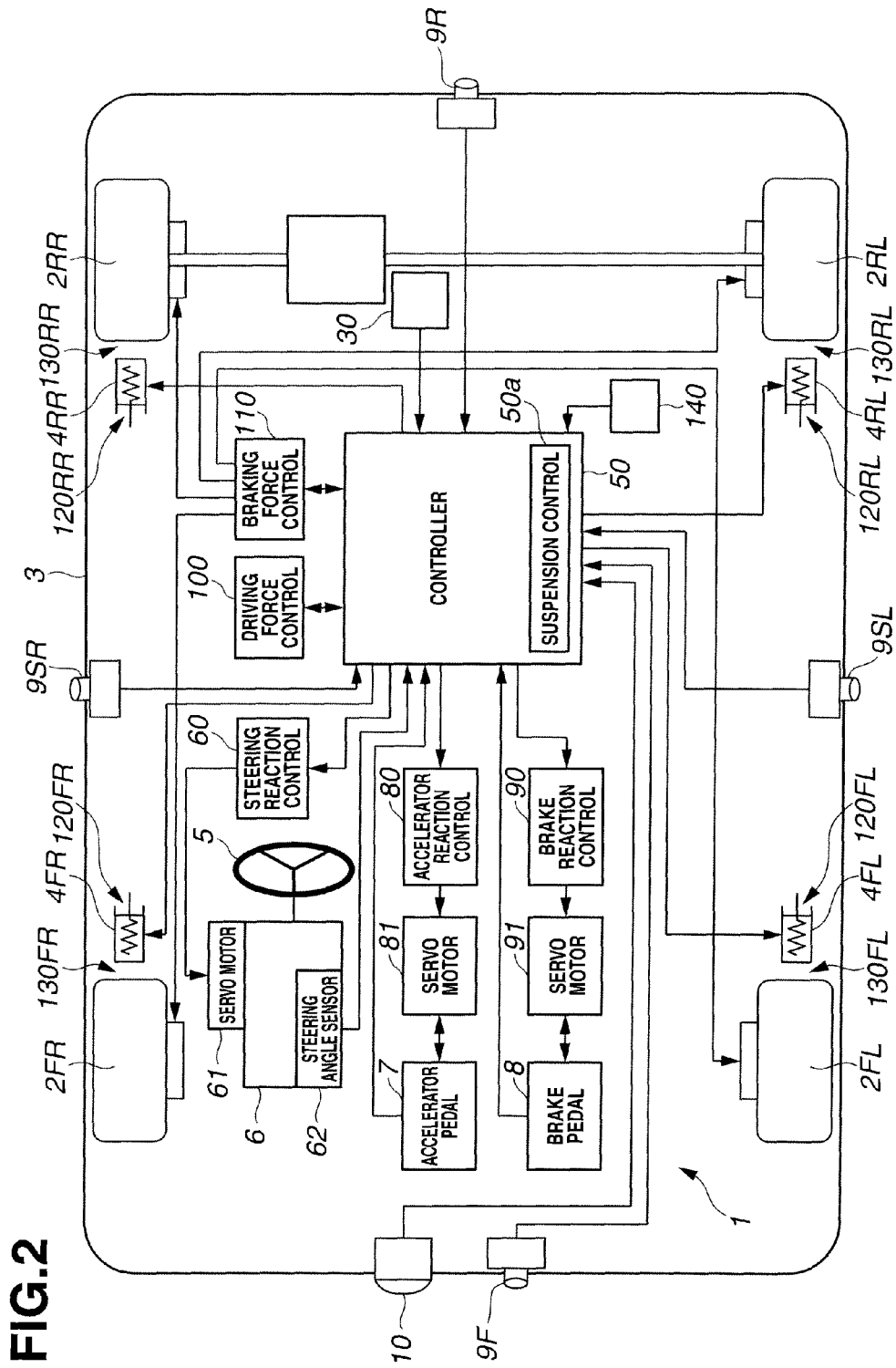
FIG. 2 is a schematic diagram showing a control system of the motor vehicle.

FIG. 2 schematically shows a control system of motor vehicle 1A. The control system shown in FIG. 2 includes: a laser radar 10; cameras 9F, 9R, 9SR and 9SL; a vehicle speed sensor 30; controller 50; a steering reaction control unit 60; servo motors 61, 81 and 91; a steering angle sensor 62; an accelerator (pedal) reaction control unit 80; a brake (pedal) reaction control unit 90; a driving force control unit 100; a braking force control unit 110; actuators 120FR, 120FL, 120RR and 120RL provided, respectively, in active suspensions 4FR, 4FL, 4RR and 4RL; vehicle body normal (or vertical) acceleration sensors 130FR, 130FL, 130RR and 130RL provided, respectively, in or near active suspensions 4FR, 4FL, 4RR and 4RL; and a vehicle condition sensing device 140.

In this example, the laser radar 10; cameras 9F, 9R, 9SR and 9SL; vehicle speed sensor 30; controller 50; steering reaction control unit 60; servo motors 61, 81 and 91; steering angle sensor 62; accelerator reaction control unit 80; brake reaction control unit 90; driving force control unit 100; braking force control unit 110; actuators 120FR, 120FL, 120RR and 120RL; vehicle body normal acceleration sensors 130FR, 130FL, 130RR and 130RL; and vehicle condition sensing device 140 are components constituting the vehicle driving operation support system 1 according to the first embodiment.

Laser radar 10 is attached to a front part, such as a grille or a bumper, of motor vehicle 1A, and arranged to scan horizontally with infrared laser pulses. Laser radar 10 senses infrared laser pulses that are reflected from objects forward of motor vehicle 1A (normally, rear end parts of preceding vehicles), and measures an individual distance between motor vehicle 1A and each object (forward vehicle or preceding vehicle), and an individual direction from motor vehicle 1A to each object (forward vehicle or preceding vehicle), by checking when the reflected infrared laser pulses reach laser radar 10. Information about the measured distances and directions is outputted to controller 50.

The direction toward each forward object is defined as an angle with respect to the longitudinal direction of motor vehicle 1A. Laser radar 10 can scan a forward region of an angle range of about −6 degrees to +6 degrees with respect to the longitudinal direction of motor vehicle 1A, and detect objects in the forward region. Laser radar 10 measures the distance and direction to each forward vehicle, and also the distance and direction to each obstacle such as a pedestrian.

Camera 9F is an image pickup device, such as a small CCD (Charge Coupled Devices) camera, or a CMOS (Complementary Metal Oxide Semiconductor) camera, which is attached to a part on the upper side of a front window of motor vehicle 1A. Camera 9F senses the condition of a forward road section in the form of imagery, and outputs the acquired image data to controller 50. Camera 9F can cover a region of a horizontal angle range of about −30 degrees to +30 degrees with respect to the longitudinal direction of motor vehicle 1A, and take imagery of the region where the forward road section extends.

Cameras 9SR and 9SL are image pickup devices, such as small CCD cameras, or CMOS cameras, which are attached to respective parts on the upper side of right and left rear side doors. Cameras 9SR and 9SL sense the conditions of regions on the right and left sides of motor vehicle 1A, especially, the conditions of lanes on the right and left sides of motor vehicle 1A, in the form of imagery, and output the acquired image data to controller 50. As compared to camera 9F, each of cameras 9SR and 9SL can cover and take imagery of a region of a wider horizontal angle range, for example, of about −60 degrees to +60 degrees, to satisfy requirements.

Camera 9R is an image pickup device, such as a small CCD camera, or a CMOS camera, which is attached to a part on the upper side of a rear window of motor vehicle 1A. Camera 9R senses the condition of a road section behind motor vehicle 1A in the form of imagery, and outputs the acquired image data to controller 50. Similar to camera 9F, the camera 9R can cover a region of a horizontal angle range of about −30 degrees to +30 degrees with respect to the longitudinal direction of motor vehicle 1A, and take imagery of the region where the road section extends on the rear side of motor vehicle 1A.

Vehicle speed sensor 30 measures the travel speed of motor vehicle 1A on a basis of a parameter such as wheel speed, and outputs data about the measured travel speed to controller 50.

Controller 50 includes a CPU (Central Processing Unit), and peripheral devices such as ROM (Read Only Memory)

and RAM (Random Access Memory). Controller 50 serves as a controller for the entire control system of motor vehicle 1A with vehicle driving operation support system 1. Controller 50 evaluates a surrounding condition or obstacle condition, i.e. the condition of the environment (including obstacles) surrounding the motor vehicle 1A, on a basis of the vehicle speed information from vehicle speed sensor 30, the distance information from laser radar 10, and the image information from cameras 9F, 9R, 9SR and 9SL. For the evaluation, the controller 50 treats the image information with image processings.

The obstacle condition includes one or more of the distance to a forward vehicle traveling ahead of the host vehicle 1A, the existence/nonexistence of another vehicle traveling in an adjacent lane after the host vehicle toward the host vehicle, the degree of approach of the other vehicle, the lateral position of the host vehicle with respect to a lane marking (white line), that is, the relative position and angle of the host vehicle, and the shape of the lane marking. The driving operation support system detects a pedestrian or a two-wheeled vehicle crossing ahead of the host vehicle, as the obstacle condition.

Controller 50 calculates a risk potential (a physical quantity representing the degree of closeness of the host vehicle 1A to an obstacle) on a basis of the obstacle condition. Moreover, controller 50 calculates a comprehensive risk potential of the surrounding around the host vehicle by synthesizing or integrating individual risk potentials of obstacles around the vehicle, and performs a cooperative control of a lateral control (control of a steering reaction (torque), a steering angle, and/or a steering gain), a longitudinal control (control of a longitudinal (driving/braking) force and/or reaction of at least one of the accelerator pedal and brake pedal) and a vertical control (control of the damping forces of the active suspensions, the fluid pressure, suspension strokes and/or spring constants), in accordance with the risk potential, as explained later.

In this embodiment, controller 50 performs the controls in the vehicle longitudinal, lateral and vertical directions in accordance with the comprehensive risk potential. During the controls, the controller 50 performs vehicle driving operation support so as to allow vehicle driving operation support system 1 to act on a driver in conformance with driver's intention. Specifically, controller 50 controls the longitudinal (driving/braking) force applied to motor vehicle 1A, and controls the reactions applied to driving operation devices that are operated by the driver for driving the motor vehicle 1A. The driving operation devices include accelerator pedal 7 and brake pedal 8 that are operated by the driver to accelerate or decelerate the motor vehicle 1A, and steering wheel 5 that is operated by the driver to turn the motor vehicle 1A.

In this example, controller 50 controls the damping characteristics of active suspensions 4FR, 4FL, 4RR and 4RL by pressure control of dampers provided in active suspensions 4FR, 4FL, 4RR and 4RL and suspension stroke control. For that control, controller 50 receives data about measured vehicle body normal accelerations $X''_{2FR}$, $X''_{2FL}$, $X''_{2RR}$ and $X''_{2RL}$ which are outputted from vehicle body normal acceleration sensors 130FR, 130FL, 130RR and 130RL. Controller 50 multiplies each of the measured vehicle body normal accelerations $X''_{2FR}$, $X''_{2FL}$, $X''_{2RR}$ and $X''_{2RL}$ by a predetermined gain Km to obtain a first quantity. In parallel, the controller 50 calculates an integral ($\int dt$) of each of the measured vehicle body normal accelerations $X''_{2FR}$, $X''_{2FL}$, $X''_{2RR}$ and $X''_{2RL}$, and multiplies the integral by a predetermined gain Kn to obtain a second quantity. Controller 50 sums the first and second quantities to obtain a third quantity, and outputs the third quantity as a command input to a corresponding one of actuators 120FR, 120FL, 120RR and 120RL which control the hydraulic pressures of the dampers of active suspensions 4FR, 4FL, 4RR and 4RL.

Steering reaction control unit 60 is installed in a steering system of motor vehicle 1A, and configured to control the servo motor 61 to generate and output a torque according to a command input from controller 50. Servo motor 61 regulates the output torque according to a command input from steering reaction control unit 60, and thereby regulates the steering reaction to a desired value while the driver is operating the steering wheel 5.

Controller 50 performs a steering reaction control on a basis of the risk potential. During the steering reaction control, the controller 50 uses a map shown in FIG. 3 for calculation and control of damping torque.

Figure 3:
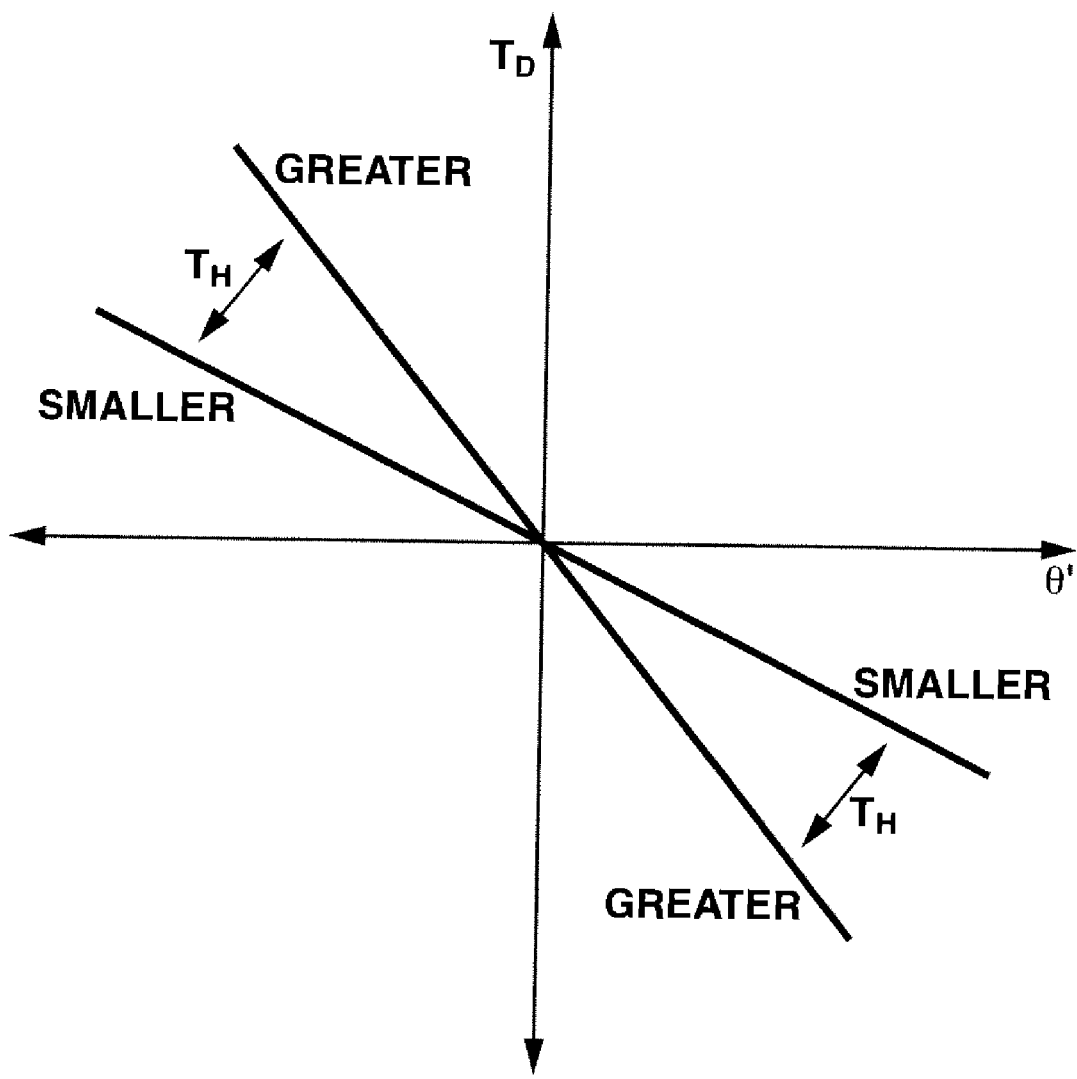
FIG. 3 is a graphic diagram showing a map for calculation and control of damping torque during control of steering reaction (torque).

Controller 50 calculates a desired damping torque $T_D$ on a basis of a steering angular speed $\theta'$ and a desired generated torque $T_H$, and adds the desired damping torque $T_D$ to a desired steering reaction torque $T_R$ to obtain a corrected desired steering reaction torque. The map is defined with respect to a horizontal axis of steering angular speed $\theta'$ and a vertical axis of damping torque $T_D$, as shown in FIG. 3. The map is set so that as steering angular speed $\theta'$ increases in the positive direction from zero, the damping torque $T_D$ decreases in the negative direction from zero in proportion to change in steering angular speed $\theta'$, and that as steering angular speed $\theta'$ decreases in the negative direction from zero, the damping torque $T_D$ increases in the positive direction from zero in proportion to change in steering angular speed $\theta'$. Moreover, the map is set so that as desired generated torque $T_H$ increases, the absolute value of the rate of change (increase or decrease) of damping torque $T_D$ with respect to change (decrease or increase) in the steering angular speed 8' increases.

Steering angle sensor 62 is a device, such as an angle sensor, which is mounted to or near a steering column or steering wheel 5. Steering angle sensor 62 senses the rotational angle of steering wheel 5 as a steering angle, and outputs steering angle information to controller 50. Accelerator pedal 7 is provided with an accelerator pedal stroke sensor not shown for sensing the amount of depression or operation of accelerator pedal 7. The information about the amount of depression or operation of accelerator pedal 7 is outputted to controller 50.

Accelerator reaction control unit 80 controls the output torque of servo motor 81 according to a command input from controller 50, where servo motor 81 is installed in a linkage of accelerator pedal 7. According to a command input from accelerator reaction control unit 80, the servo motor 81 adjusts the accelerator reaction force, i.e. the driver's depressing force required for operation of accelerator pedal 7, to a given setpoint.

Brake pedal 8 is provided with a brake pedal stroke sensor not shown for sensing the amount of depression or operation of brake pedal 8. Information about the amount of depression or operation of brake pedal 8 is outputted to controller 50. Brake reaction control unit 90 controls a brake booster not shown to generate a brake assist force applied to brake pedal 8, according to a command input from controller 50. According to a command input from brake reaction control unit 90, the brake booster regulates the brake assist force, and thereby adjusts the brake reaction force, i.e. the driver's depressing force required for operation of brake pedal 8, to a given setpoint. As the brake assist force increases, the brake reaction force decreases so as to make it easier for a driver to depress the brake pedal 8.

Driving force control unit 100 includes an engine controller, and controls engine torque with the engine controller according to a command input from controller 50. Braking force control unit 110 includes a brake fluid pressure controller, and controls brake fluid pressure with the brake fluid pressure controller according to a command input from controller 50. Vehicle condition sensing device 140 includes various sensors for sensing the condition of motor vehicle 1A, such as a lateral acceleration sensor, a yaw rate sensor, an accelerator opening sensor, and a brake fluid pressure sensor, and outputs information about a measured lateral acceleration (lateral G), yaw rate, accelerator opening ACC, brake fluid pressure BRK, etc., to controller 50.

Figure 4:
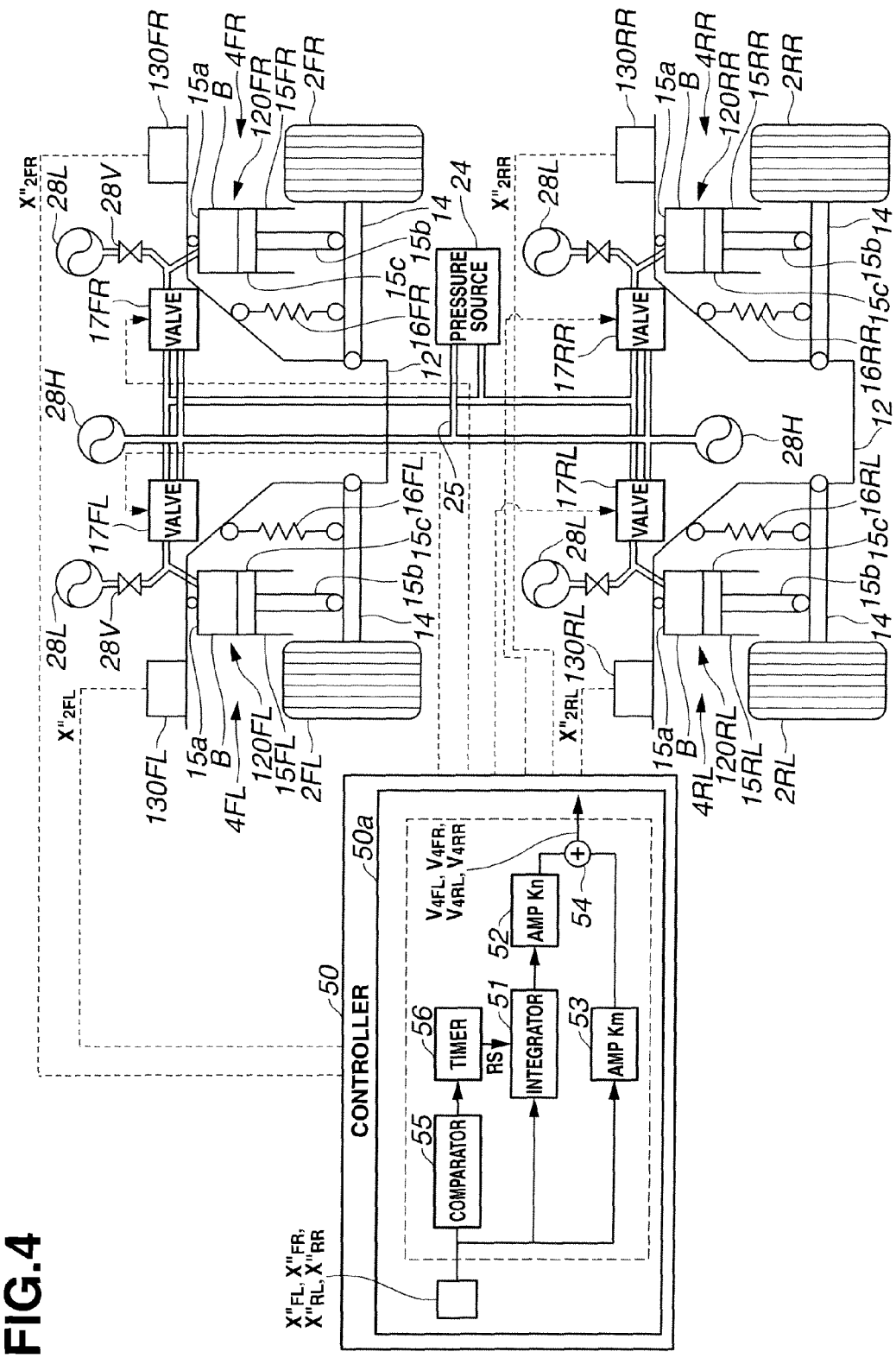
FIG. 4 is a schematic diagram showing an active suspension system of the motor vehicle.

<Active Suspension Mechanism> FIG. 4 schematically shows the active suspension system or mechanism employed in the motor vehicle 1A of this example. As shown in FIG. 4, each of active suspensions 4FR, 4FL, 4RR and 4RL is disposed between a body side member 12 of the vehicle body and a wheel side member 14 supporting a corresponding one of wheel 2FR, 2FL, 2RR and 2RL. Each of active suspensions 4FR, 4FL, 4RR and 4RL includes the actuator 120FR, 120FL, 120RR or 120RL, a coil spring 16FR, 16FL, 16RR or 16RL, and a pressure control valve 17FR, 17FL, 17RR or 17RL controlling the operating fluid pressure for the corresponding actuator only in response to a command from controller 50. Pressure control valves 17FR, 17FL, 17RR and 17RL are connected with a fluid pressure source 24 by a fluid passage 25. At least one high pressure side accumulator 28H is connected with the fluid passage 25. The pressure control valve of each active suspension is connected with a corresponding one of low pressure side accumulator 28L by a fluid passage having a throttling valve 28V. The actuator 120FR, 120FL, 120RR or 120RL of each active suspension includes a hydraulic cylinder 15FR, 15FL, 15RR or 15RL which is connected with the fluid passage connecting the pressure control valve 17FR, 17FL, 17RR or 17RL and the low pressure side accumulator 28L.

Each of actuators 120FR, 120FL, 120RR and 120RL includes a cylinder tube 15a, a piston rod 15b, and a piston 15c. Cylinder tube 15a is mounted to body side member 12. Piston rod 15b is mounted to wheel side member 14. Piston 15c defines an upper side pressure chamber B in cylinder tube 15a. The operating fluid pressure in upper side pressure chamber B is controlled by pressure control valve 17FR, 17FL, 17RR or 17RL. Each of coil springs 16FR, 16FL, 16RR and 16RL is connected between body side member 12 and wheel side member 14, in parallel to a corresponding one of actuators 120FR, 120FL, 120RR and 120RL, for bearing a static load due to the weight of motor vehicle 1A. The spring coefficient of each coil spring 16FR, 16FL, 16RR or 16RL may be low, if it can bear the static load due to the weight of motor vehicle 1A.

When the internal pressure of upper side pressure chamber B rises (or falls) due to an upward (or downward) input of vibration, then pressure control valve 17FR, 17FL, 17RR or 17RL functions to reduce (or increase) the internal pressure of upper side pressure chamber B, for absorbing the rise (or fall) of the internal pressure of upper side pressure chamber B. In this way, active suspensions 4FR, 4FL, 4RR and 4RL can reduce the input of vibration transmitted to body side member 12. Each of vehicle body normal acceleration sensors 130FR, 130FL, 130RR and 130RL is mounted to a part of vehicle body 3 just above a corresponding one of wheels 2FR, 2FL, 2RR and 2RL, for outputting information about the measured vehicle body normal accelerations $X''_{2FR}$, $X''_{2FL}$, $X''_{2RR}$ and $X''_{2RL}$ to controller 50.

Controller 50 includes a suspension control section 50a for controlling the active suspensions 4FR, 4FL, 4RR and 4RL. Suspension control section 50a has a function of multiplying each of the measured vehicle body normal accelerations $X''_{2FR}$, $X''_{2FL}$, $X''_{2RR}$ and $X''_{2RL}$ by gain Km to obtain the first quantity, a function of calculating the integral ($\int dt$) of each of the measured vehicle body normal accelerations $X''_{2FR}$, $X''_{2FL}$, $X''_{2RR}$ and $X''_{2RL}$ and multiplying the integral by gain Kn to obtain the second quantity, and a function of summing the first and second quantities to obtain the third quantity. The information about the third quantities is supplied in the form of command values V4FR, V4FL, V4RR and V4RL to pressure control valves 17FR, 17FL, 17RR and 17RL.

As shown in FIG. 4, suspension control section 50a includes an integrator 51 for receiving and integrating the measured vehicle body normal accelerations $X''_{2FR}$, $X''_{2FL}$, $X''_{2RR}$ and $X''_{2RL}$ to obtain measured vehicle body normal speeds $X'_{2FR}$, $X'_{2FL}$, $X'_{2RR}$ and $X'_{2RL}$, and an amplifier 52 for amplifying each of the measured vehicle body normal speeds $X'_{2FR}$, $X'_{2RR}$ and $X'_{2RL}$ by gain Kn. Suspension control section 50a further includes an amplifier 53 for amplifying each of the measured vehicle body normal accelerations $X''_{2FR}$, $X''_{2FL}$, $X''_{2RR}$ and $X''_{2RL}$ by gain Km, and an adder 54 for receiving and adding the outputs of amplifiers 52 and 53. The measured vehicle body normal accelerations $X''_{2FR}$, $X''_{2FL}$, $X''_{2RR}$ and $X''_{2RL}$ are also inputted to a comparator 55. In this example, comparator 55 is a window comparator for outputting a reference signal indicative of a logic number of "1" to a timer 56 when the measured vehicle body normal accelerations $X''_{2FR}$, $X''_{2FL}$, $X''_{2RR}$ and $X''_{2RL}$ are within predetermined upper and lower bounds. Timer 56 determines whether or not the output of the reference signal has continued for a predetermined period. When determining that the output of the reference signal has continued for the predetermined period, then timer 56 outputs a reset signal RS to integrator 51 so that integrator 51 resets or clears the stored data.

Suspension control section 50a controls the gains Km and Kn in such a manner that the input of vibration from a road surface to vehicle body 3 is cancelled almost at all, or in such a manner that the input of vibration is transmitted from the road surface to vehicle body 3 without being cancelled or suppressed. Suspension control section 50a can generate and output command values V4FR, V4FL, V4RR and V4RL to pressure control valves 17FR, 17FL, 17RR and 17RL independently of an input from a road surface, so as to allow active suspensions 4FR, 4FL, 4RR and 4RL to perform functions other than suppression of the input of vibration from a road surface, for example, to control motion, such as rolling motion or pitching motion, of motor vehicle 1A.

<Control Processes in Controller> The driving operation support system of this embodiment calculates a risk potential RP of vehicle 1A, varies the degree of reduction of road surface noise that is noise transmitted from the road surface, in accordance with the risk potential RP, and performs a driving operation support process for assisting a driver's operation for vehicle longitudinal motion and vehicle lateral motion in accordance with the risk potential RP.

<Risk Potential Calculation> FIG. 5 is a flow chart showing a process of calculating a risk potential, which is performed by controller 50. Controller 50 starts the process in response to a command input by a driver for vehicle driving operation support system 1 to perform a vehicle driving operation support function. As shown in FIG. 5, the process is started at Step S1 where controller 50 reads the traveling condition of motor vehicle 1A.

The traveling condition includes the obstacle condition, i.e. the condition of the environment (including obstacles) surrounding the motor vehicle 1A. Specifically, controller 50 reads: the relative distance and angle to each forward vehicle from laser radar 10; the relative position (relative lateral displacement and angle) and shape of each lane making line, and the relative distance and angle to each forward vehicle, based on the image input from camera 9F; the relative distance and angle to each vehicle present on the rear side of motor vehicle 1A in the adjacent lanes based on the image input from cameras 9R, 9SR and 9SL. Controller 50 also reads the measured vehicle speed from vehicle speed sensor 30. Controller 50 recognizes based on acquired images the type of each obstacle present in the environment surrounding the motor vehicle 1A, namely, whether the obstacle is a four-wheeled vehicle, two-wheeled vehicle, pedestrian or another.

Subsequent to Step S1, at Step S2, controller 50 recognizes the current surrounding condition on a basis of data about the traveling condition. Controller 50 recognizes or calculates the current relative position, traveling direction, and traveling speed of each obstacle with respect to motor vehicle 1A, on a basis of the current traveling condition data acquired at Step S1, and the data about the relative position, traveling direction, and traveling speed of each obstacle with respect to motor vehicle 1A which is obtained in the previous cycles of calculation, and memorized in the RAM of controller 50. In this way, controller 50 recognizes how each obstacle such as other vehicle or lane marking line is located around motor vehicle 1A, and traveling with respect to motor vehicle 1A.

Subsequent to Step S2, at Step S3, controller 50 calculates a time margin TTC (Time To Collision) to each obstacle that is recognized at Step S2. The time margin to a k-th obstacle TTCk is calculated by equation (1).

$$TTCk=(Dk-\sigma(Dk))/(Vrk+\sigma(Vrk)) \quad (1)$$

where:

Dk represents a distance to the k-th obstacle from motor vehicle 1A;

Vrk represents a speed of the k-th obstacle with respect to motor vehicle 1A;

$\sigma(Dk)$ represents a relative distance dispersion; and $\sigma(Vrk)$ represents a relative speed dispersion.

The relative distance dispersion $\sigma(Dk)$ and relative speed dispersion $\sigma(Vrk)$ are set on a basis of the type of the sensor sensing the k-th obstacle and the type of the k-th obstacle, in consideration of the uncertainty of the sensors, and the degree of influence by occurrence of unexpected situations. Specifically, when the relative distance Dk is measured by laser radar 10, the relative distance dispersion $\sigma(Dk)$ is set to a substantially constant value independently of the relative distance Dk, because laser radar 10 can measure the relative distance more accurately than cameras 9F, 9R, 9SR and 9SL. On the other hand, when the relative distance Dk is measured by camera 9F, 9R, 9SR or 9SL, the relative distance dispersion $\sigma(Dk)$ is set so that the relative distance dispersion $\sigma(Dk)$ increases exponentially as the relative distance Dk increases. When the relative distance Dk is short, the relative distance dispersion $\sigma(Dk)$ is set smaller than in the case of laser radar 10, because cameras 9F, 9R, 9SR and 9SL can perform more accurate measurement under such conditions. The images acquired by cameras 9F, 9R, 9SR and 9SL are treated with image processings to recognize the type of each obstacle. Accordingly, when the obstacle condition is sensed by cameras 9F, 9R, 9SR and 9SL, the relative distance dispersion $\sigma(Dk)$ and the relative speed dispersion $\sigma(Vrk)$ are set according to the type of the k-th obstacle.

When the relative distance Dk is measured by camera 9F, 9R, 9SR or 9SL, the accuracy of the relative distance Dk increases as the size of the k-th obstacle increases. Accordingly, the relative distance dispersion $\sigma(Dk)$ is set smaller for four-wheeled vehicles than for two-wheeled vehicles and pedestrians. On the other hand, the relative speed dispersion $\sigma(Vrk)$ is set so that the relative speed dispersion $\sigma(Vrk)$ increases with an increase in an assumed travel speed of the k-th obstacle. Specifically, the relative speed dispersion $\sigma(Vrk)$ are set larger for four-wheeled vehicles than for two-wheeled vehicles and pedestrians, because it can be assumed that the travel speed of a four-wheeled vehicle is higher than that of a two-wheeled vehicle or pedestrian.

When the k-th obstacle is sensed by both of laser radar 10 and camera 9F, 9R, 9SR or 9SL, the larger one of the relative distance dispersions $\sigma(Dk)$ and the larger one of the relative speed dispersions $\sigma(Vrk)$ may be used to calculate the time margin TTCk to the k-th obstacle.

Subsequent to Step S3, at Step S4, controller 50 calculates an individual risk potential of the k-th obstacle, RPk on a basis of the time margin TTCk, using equation (2).

$$RPk=(1/TTCk)\times wk \quad (2)$$

where wk represents a weight related to the k-th obstacle.

As shown in equation (2), the risk potential RPk is expressed with the reciprocal of the time margin TTCk, as a function of time margin TTCk, so that a larger risk potential RPk indicates a higher degree of approach of motor vehicle 1A to the k-th obstacle.

The weight wk is set according to the type of the k-th obstacle. For example, when the k-th obstacle is a four-wheeled vehicle or two-wheeled vehicle, or pedestrian, the weight wk is set to 1, because the degree of influence of approach of the k-th obstacle to motor vehicle 1A is high. On the other hand, when the k-th obstacle is an object such as lane marking line which does not collide with the motor vehicle 1A, the weight wk is set to 0.5.

Subsequent to Step S4, at Step S5, controller 50 extracts the longitudinal component from each risk potential RPk, and sums the longitudinal components to obtain a comprehensive longitudinal risk potential RPx concerning all the obstacles in the environment surrounding the motor vehicle 1A. The longitudinal risk potential RPx is calculated using equation (3).

$$RPx=\Sigma_k(RPk\times\cos\theta k) \quad (3)$$

where $\theta k$ represents an angle of the direction from motor vehicle 1A to the k-th obstacle with respect to the longitudinal direction of motor vehicle 1A.

When the k-th obstacle is located just forward in the longitudinal direction from motor vehicle 1A, $\theta k$ is set to zero. When the k-th obstacle is located just behind in the longitudinal direction from motor vehicle 1A, $\theta k$ is set to 180 degrees.

Subsequent to Step S5, at Step S6, controller 50 extracts the lateral component from each risk potential RPk, and sums the lateral components to obtain a comprehensive lateral risk potential RPy concerning all the obstacles in the environment surrounding the motor vehicle 1A. The lateral risk potential RPy is calculated using equation (4).

$$RPy=\Sigma_k(RPk\times\sin\theta k) \quad (4)$$

Subsequent to Step S6, at Step S7, controller 50 sums the individual risk potentials RPk to obtain a comprehensive risk potential RP. Subsequent to Step S7, controller 50 repeats the process described above, until the driver inputs a command to terminate the vehicle driving operation support function. The parameters, such as the risk potential RP, which are calculated in the process, are memorized in the RAM of controller 50, and set available to other processes.

<Steering Operation Support> Controller 50 performs a steering operation support function as part of the vehicle driving operation support function. FIG. 6 is a flow chart showing a process of steering operation support, which is performed by controller 50. The process is started in response to a command input by a driver for vehicle driving operation support system 1 to start the steering operation support function. One cycle of the process is executed by interruption at a predetermined interval such as of 10 ms. As shown in FIG. 6, the process is started with Step S101 where controller 50 determines whether or not a count i is equal to zero. The count i is initially set to an initial value of zero.

When determining at Step S101 that the count i is equal to zero, then controller 50 proceeds to Step S102 where controller 50 calculates the risk potential RP. Subsequent to Step S102, at Step S103, controller 50 determines whether or not the risk potential RP is above a predetermined threshold value RP0. When determining at Step S103 that the risk potential RP is not above the threshold value RP0, then controller 50 proceeds to Step S104 where controller 50 sets a provisional desired steering reaction Fs as a provisional control setpoint to zero.

Figure 7:
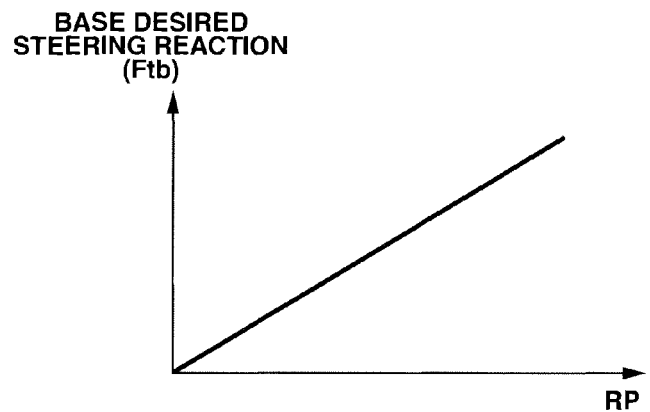
FIG. 7 is a graphic diagram showing a relationship between the risk potential and a base provisional desired steering reaction according to the first embodiment.

On the other hand, when determining at Step S103 that the risk potential RP is above the threshold value RP0, then controller 50 proceeds to Step S105 where controller 50 calculates the provisional desired steering reaction Fs. Specifically, controller 50 calculates a base provisional desired steering reaction Ftmp on a basis of the risk potential RP, using a map of base provisional desired steering reaction Ftb, and sums the base provisional desired steering reaction Ftmp and a value of a steering reaction correction Fa which is calculated in the last cycle of control or calculation, to obtain the provisional desired steering reaction Fs. The provisional desired steering reaction Fs may be calculated by summing the base provisional desired steering reaction Ftmp and the difference between values of base provisional desired steering reaction Ftmp and a normal desired steering reaction Fp which are calculated in the last cycle of control or calculation. FIG. 7 shows a relationship between the risk potential RP and the base provisional desired steering reaction Ftb, where the base provisional desired steering reaction Ftb increases as the risk potential RP increases.

Subsequent to Step S104 or S105, at Step S106, controller 50 implements the provisional desired steering reaction Fs with steering reaction control unit 60, namely, produces a steering reaction and conforms the same to the provisional desired steering reaction Fs with steering reaction control unit 60. Subsequent to Step S106, at Step S107, controller 50 sets the count i to 1, and then returns to Step S101.

When determining at Step S101 that the count i is not equal to zero, then controller 50 proceeds to Step S108 where controller 50 senses or measures driver's reaction to the controlled steering reaction, namely, driver's operation in reaction to the controlled steering reaction. In this example, controller 50 senses or measures driver's steering operation in the form of steering speed under the condition that the steering reaction is produced by vehicle driving operation support system 1 for supporting or assisting the driver in operating the motor vehicle 1A.

Subsequent to Step S108, at Step S109, controller 50 calculates the normal desired steering reaction Fp as a normal control setpoint on a basis of the risk potential RP and the measured driver's reaction or measured steering operation in the form of steering speed. Specifically, controller 50 calculates a base steering reaction correction Fbs on a basis of the risk potential RP, calculates a correction coefficient α on a basis of driver's steering speed, multiplies the base steering reaction correction Fbs by the correction coefficient α to obtain the steering reaction correction Fa, and adds the steering reaction correction Fa to the provisional desired steering reaction Fs to obtain the normal desired steering reaction Fp.

Figure 8:
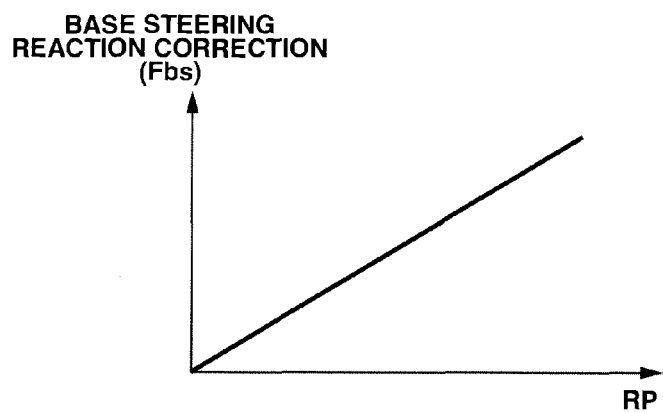
FIG. 8 is a graphic diagram showing a relationship between the risk potential and a base steering reaction correction according to the first embodiment.
Figure 9:
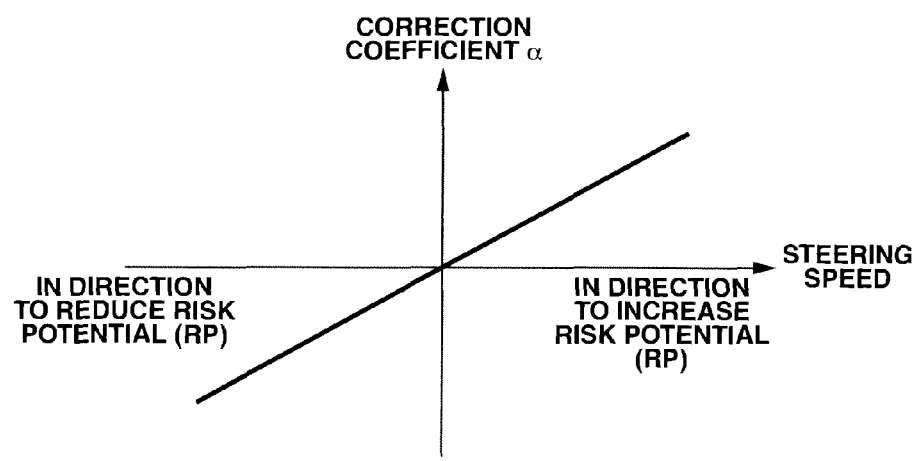
FIG. 9 is a graphic diagram showing a relationship between driver's steering speed and a correction coefficient according to the first embodiment.

FIG. 8 shows a relationship between the risk potential RP and the base steering reaction correction Fbs, where the base steering reaction correction Fbs increases as the risk potential RP increases. FIG. 9 shows a relationship between the driver's steering speed and the correction coefficient α, where the driver's steering speed is defined to be positive in a direction to increase the risk potential RP. In FIG. 9, the correction coefficient α increases as the steering speed increases in the direction to increase the risk potential RP, whereas the correction coefficient α decreases as the steering speed decreases in the direction to reduce the risk potential RP. Specifically, when the driver operates steering wheel 5 at a steering speed in the direction to reduce the risk potential RP, the correction coefficient α is negative so that the steering reaction correction Fa is negative. In this way, controller 50 obtains the normal desired steering reaction Fp by increasing the provisional desired steering reaction Fs in magnitude, when the sensed driver's operation is in the direction to increase the risk potential RP.

Subsequent to Step S109, at Step S110, controller 50 implements the normal desired steering reaction Fp with steering reaction control unit 60, namely, produces a steering reaction and conforms the same to the normal desired steering reaction Fp with steering reaction control unit 60. Subsequent to Step S110, at Step S111, controller 50 resets the count i to zero, and then returns to Step S101. In this way, controller 50 calculates and implements the provisional desired steering reaction Fs and normal desired steering reaction Fp alternately. The foregoing process can achieve suitable control of steering reaction in conformance with driver's intention.

Figure 10:
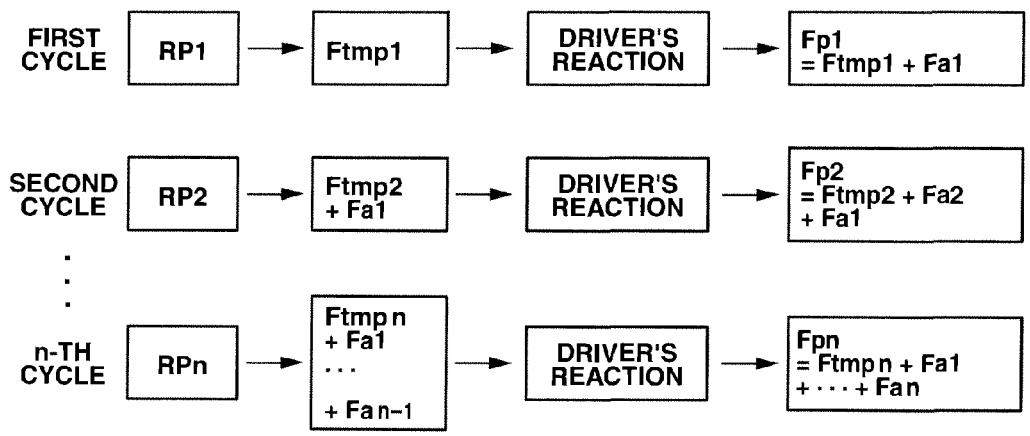
FIG. 10 is a diagram showing how a provisional desired steering reaction and a normal desired steering reaction are calculated by the process of steering operation support according to the first embodiment.
Figure 11:
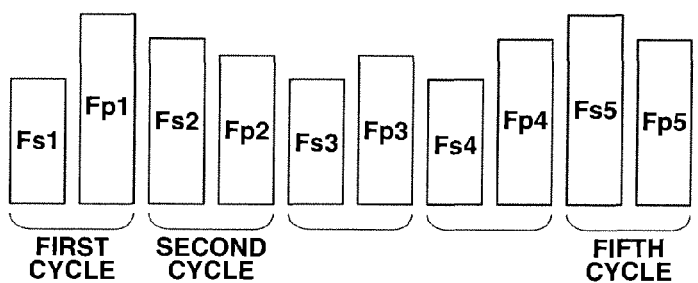
FIG. 11 is a diagram showing an example of how the steering reaction is controlled to change according to the calculation of FIG. 10.

<Operations> FIG. 10 shows how the provisional desired steering reaction Fs and normal desired steering reaction Fp are calculated by the process of steering operation support according to the first embodiment. FIG. 11 shows an example of how the steering reaction is controlled to change according to the calculation of FIG. 10. In FIGS. 10 and 11, each of the numbers given to the risk potential RP, base provisional desired steering reaction Ftmp, provisional desired steering reaction Fs, normal desired steering reaction Fp, and steering reaction correction Fa, indicates the order of a corresponding cycle of control or calculation.

As shown in FIG. 10, during the first cycle of control or calculation, a first provisional desired steering reaction value Fs1 is set to a base provisional desired steering reaction value Ftmp1 which is derived on a basis of a risk potential value RP1 from the table of base provisional desired steering reaction Ftb. The first provisional desired steering reaction value Fs1 is implemented as shown in FIG. 11. In response to measurement of driver's reaction in the form of steering operation, a first normal desired steering reaction value Fp1 is calculated by summing the first provisional desired steering reaction value Fs1 and a steering reaction correction value Fa1 (Fp1=Fs1+Fa1=Ftmp1+Fa1), and is implemented as shown in FIG. 11.

Subsequently, during the second cycle of control, a second provisional desired steering reaction value Fs2 is calculated by summing the previously calculated steering reaction correction value Fa1 and a base provisional desired steering reaction value Ftmp2 which is derived on a basis of a risk potential value RP2 from the table of base provisional desired steering reaction Ftb. The second provisional desired steering reaction value Fs2 is implemented as shown in FIG. 11. In response to measurement of driver's reaction in the form of steering operation, a second normal desired steering reaction value Fp2 is calculated by summing the second provisional desired steering reaction value Fs2 and a steering reaction correction value Fa2, namely, by summing the base provisional desired steering reaction value Ftmp2, steering reaction correction value Fa1, and steering reaction correction value Fa2 (Fp2=Fs2+Fa2=Ftmp2+Fa1+Fa2), and is implemented as shown in FIG. 11. Vehicle driving operation support system 1 repeats the foregoing process.

According to the foregoing process of steering operation support, the control of steering reaction is smoothly shifted between the cycles of control or calculation, because previously calculated values of the steering reaction correction Fa are cumulatively added to obtain the provisional desired steering reaction Fs and normal desired steering reaction Fp. With vehicle driving operation support system 1, the motor vehicle 1A produces a provisional steering reaction on a basis of the risk potential RP, senses or measures driver's operation, and adds a corresponding correction to produce a normal steering reaction. In the next cycle, motor vehicle 1A produces a provisional steering reaction on the basis of the provisional desired steering reaction Fs which is calculated by summing the previously calculated correction and the base provisional desired steering reaction Ftmp which is calculated based on the risk potential RP. This is effective for conforming the provisional desired steering reaction Fs to the normal desired steering reaction Fp which is calculated in consideration of driver's reaction to provisional desired steering reaction Fs. In this way, vehicle driving operation support system 1 can support or assist a driver in vehicle operation in conformance with driver's intention.

Cameras 9F, 9R, 9SR and 9SL and controller 50 serve as an environment sensing section or means for sensing an environment surrounding a vehicle. Vehicle speed sensor 30 and vehicle condition sensing device 140 serve as a traveling condition sensing section or means for sensing a traveling condition of the vehicle. Steering reaction control unit 60 serves as a vehicle control section or means for controlling the vehicle on a basis of a control setpoint. Controller 50 serves as a provisional control setpoint setting section or means for calculating a risk potential of the vehicle on a basis of the sensed environment and the sensed traveling condition, and setting on a basis of the calculated risk potential the control setpoint to a provisional setpoint effective for reducing the risk potential, and also serves as a normal control setpoint setting section or means for setting the control setpoint to a normal setpoint on a basis of sensed driver's operation. Steering angle sensor 62 and controller 50 serve as a driver's reaction sensing section or means for sensing driver's operation in reaction to the controlling operation of the vehicle control means with the control setpoint set to the provisional setpoint. Controller 50 serves as a driving operation support condition sensing section or means for sensing a driving operation support condition of the vehicle. The driving operation support condition includes information about provisional desired steering reaction Fs, steering reaction correction Fa, and normal desired steering reaction Fp.

<Advantageous Effects> <1> A vehicle driving operation support apparatus comprising: an environment sensing section (9F, 9R, 9SR, 9SL, 10, 50) configured to sense an environment surrounding a vehicle (1A); a traveling condition sensing section (30, 140) configured to sense a traveling condition of the vehicle (1A); a vehicle control section (60) configured to control the vehicle (1A) on a basis of a control setpoint (Fs, Fp); a provisional control setpoint setting section (50) configured to: calculate a risk potential (RP) of the vehicle (1A) on a basis of the sensed environment and the sensed traveling condition; and set on a basis of the calculated risk potential (RP) the control setpoint to a provisional setpoint (Fs) effective for reducing the risk potential (RP); a driver's reaction sensing section (62, 50) configured to sense driver's operation (θ') in reaction to the controlling operation of the vehicle control section (60) with the control setpoint set to the provisional setpoint (Fs); and a normal control setpoint setting section (50) configured to set the control setpoint to a normal setpoint (Fp) on a basis of the sensed driver's operation (θ'), is effective for conforming the controlling operation of the vehicle control section (60) to driver's intention, on the basis of driver's operation in reaction to the control setpoint set to the provisional setpoint (Fs), and thereby performing suitable vehicle driving operation support in conformance with driver's intention.

<2> The vehicle driving operation support apparatus further comprising a driving operation support condition sensing section (50) configured to sense a driving operation support condition (Fp, Fa) of the vehicle (1A), wherein the provisional control setpoint setting section (50) is configured to calculate the provisional setpoint (Fs) on a basis of the driving operation support condition (Fp, Fa), is effective for setting the provisional setpoint in consideration of the condition of vehicle driving operation support and driver's intention to the condition, and thereby performing more suitable vehicle driving operation support in conformance with driver's intention.

<3> The vehicle driving operation support apparatus, wherein: the vehicle control section (60) is configured to produce a steering reaction ($T_R$) for steering operation support; and the provisional control setpoint setting section (50) is configured to calculate the provisional setpoint (Fs) on a basis of the calculated risk potential (RP) and the sensed driver's operation (A', or Fa directly), is effective for smoothly shifting the controlling operation of the vehicle control section (60) between the cycles of control, while providing a suitable provisional setpoint in conformance with the current vehicle traveling condition.

Application Example 1

The risk potential RP may be calculated differently. Specifically, the risk potential RP may be calculated on a basis of the reciprocal of a period Tx in which motor vehicle 1A may reach a predetermined area around a forward vehicle, and the reciprocal of a period Tw in which motor vehicle 1A may contact the forward vehicle, using the equation of RP=La/Tx+Lb/Tw, where La and Lb represents predetermined coefficients.

Application Example 2

Figure 12:
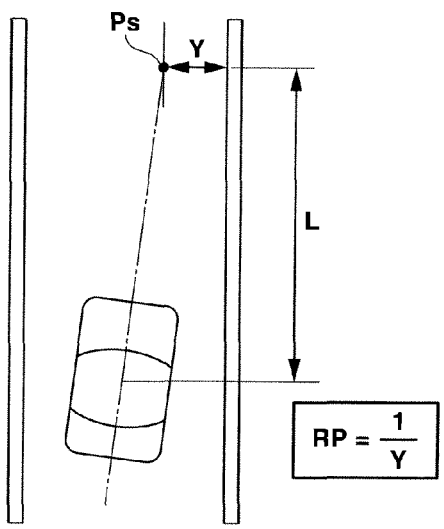
FIG. 12 is a diagram showing an example of risk potential calculation.

The risk potential RP may be calculated differently. Specifically, the risk potential RP may be calculated on a basis of the distance to a lane marking line from the current position of motor vehicle 1A or a forward position in the longitudinal direction from motor vehicle 1A. As shown in FIG. 12, the risk potential RP may be calculated using the equation of RP=1/Y, where Y represents the distance between the forward point Ps a distance L ahead from motor vehicle 1A and the lane marking line.

Application Example 3

The risk potential RP may be set by sensing driver's reaction in the form of driver's pedal operation (angle of depression, or depressing force) or steering operation (steering angle, steering angular speed, or steering torque), and setting the risk potential RP so that the risk potential RP increases as the level of driver's reaction decreases.

Second Embodiment

Motor vehicle 1A according to a second embodiment of the present invention differs from the first embodiment in detailed contents of steering operation support. The basis construction of motor vehicle 1A is the same as in the first embodiment. The following describes detailed contents of steering operation support according to the second embodiment.

Figure 13:
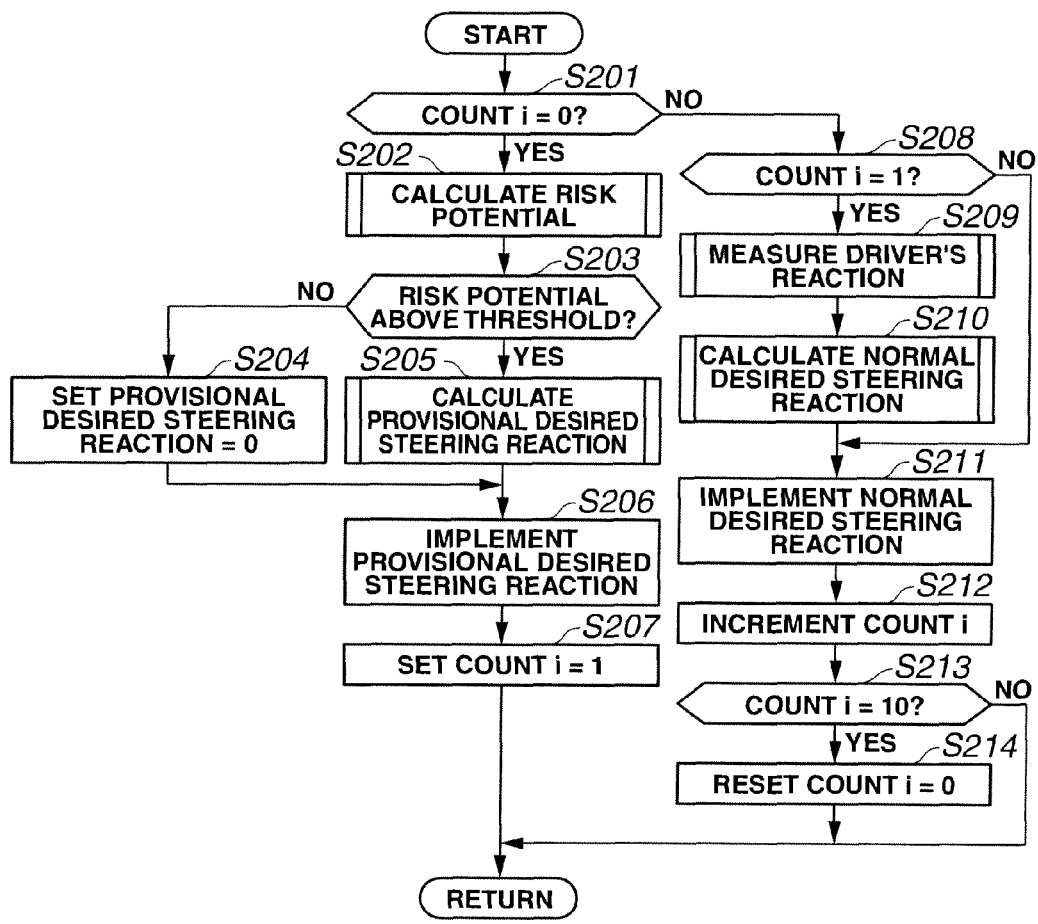
FIG. 13 is a flow chart showing a process of steering operation support according to a second embodiment of the present invention, which is performed by the controller.

<Steering Operation Support> Controller 50 performs a steering operation support function as part of the vehicle driving operation support function. FIG. 13 is a flow chart showing a process of steering operation support, which is performed by controller 50. The process is started in response to a command input by a driver for vehicle driving operation support system 1 to start the steering operation support function. One cycle of the process is executed by interruption at a predetermined interval such as of 10 ms. As shown in FIG. 13, the process is started with Step S201 where controller 50 determines whether or not a count i is equal to zero. The count i is initially set to an initial value of zero.

When determining at Step S201 that the count i is equal to zero, then controller 50 proceeds to Step S202 where controller 50 calculates the risk potential RP. Subsequent to Step S202, at Step S203, controller 50 determines whether or not the risk potential RP is above a predetermined threshold value RP0. When determining at Step S203 that the risk potential RP is not above the threshold value RP0, then controller 50 proceeds to Step S204 where controller 50 sets a provisional desired steering reaction Fs to zero.

Figure 14:
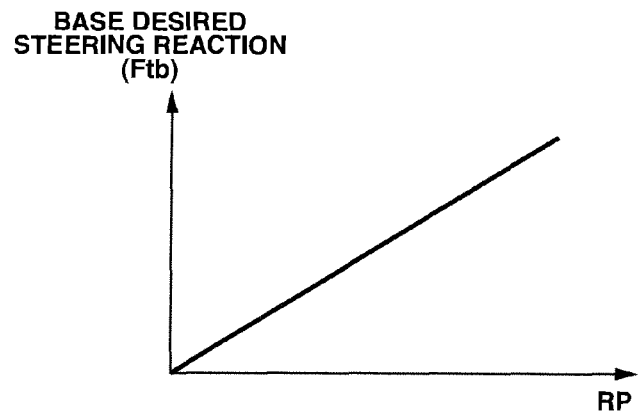
FIG. 14 is a graphic diagram showing a relationship between the risk potential and a base provisional desired steering reaction according to the second embodiment.

On the other hand, when determining at Step S203 that the risk potential RP is above the threshold value RP0, then controller 50 proceeds to Step S205 where controller 50 calculates the provisional desired steering reaction Fs. Specifically, controller 50 calculates a base provisional desired steering reaction Ftmp on a basis of the risk potential RP, using a map of base provisional desired steering reaction Ftb, and sets the provisional desired steering reaction Fs to the base provisional desired steering reaction Ftmp. FIG. 14 shows a relationship between the risk potential RP and the base provisional desired steering reaction Ftb, where the base provisional desired steering reaction Ftb increases as the risk potential RP increases.

Subsequent to Step S204 or S205, at Step S206, controller 50 implements the provisional desired steering reaction Fs with steering reaction control unit 60, namely, produces a steering reaction and conforms the same to the provisional desired steering reaction Fs with steering reaction control unit 60. Subsequent to Step S206, at Step S207, controller 50 sets the count i to 1, and then returns to Step S201.

When determining at Step S201 that the count i is not equal to zero, then controller 50 proceeds to Step S208 where controller 50 determines whether or not the count i is equal to 1. When determining at Step S208 that the count i is not equal to 1, then controller 50 proceeds to Step S211. On the other hand, when determining at Step S208 that the count i is equal to 1, then controller 50 proceeds to Step S209 where controller 50 senses or measures driver's reaction to the controlled steering reaction. In this example, controller 50 senses or measures driver's steering operation in the form of steering speed under the condition that the steering reaction is produced by vehicle driving operation support system 1 for supporting or assisting the driver in operating the motor vehicle 1A.

Subsequent to Step S209, at Step S210, controller 50 calculates a normal desired steering reaction Fp on a basis of the risk potential RP and the measured driver's reaction or measured steering operation in the form of steering speed. Specifically, controller 50 calculates a base steering reaction correction Fbs on a basis of the risk potential RP, calculates a correction coefficient α on a basis of driver's steering speed, multiplies the base steering reaction correction Fbs by the correction coefficient α to obtain the steering reaction correction Fa, and adds the steering reaction correction Fa to the provisional desired steering reaction Fs to obtain the normal desired steering reaction Fp.

Figure 15:
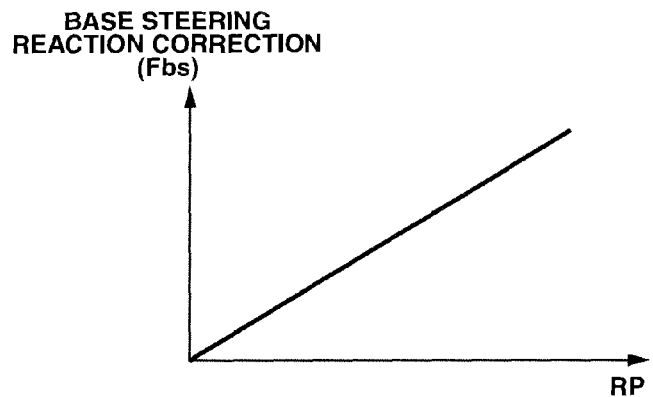
FIG. 15 is a graphic diagram showing a relationship between the risk potential and a base steering reaction correction according to the second embodiment.
Figure 16:
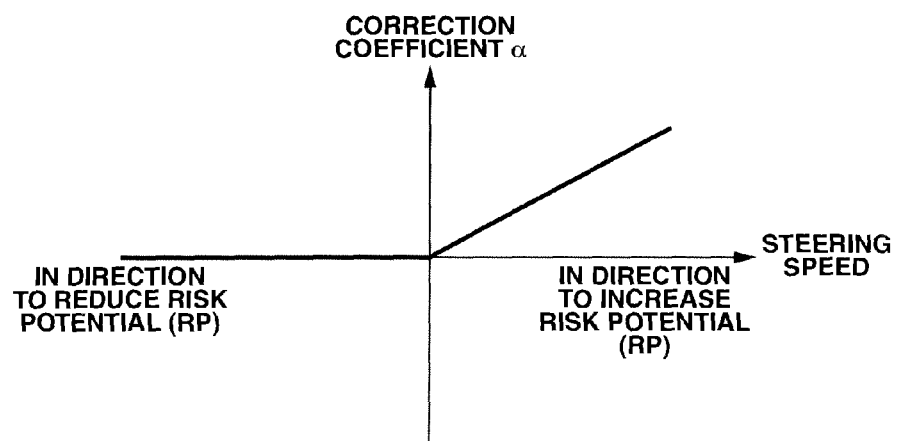
FIG. 16 is a graphic diagram showing a relationship between driver's steering speed and a correction coefficient according to the second embodiment.

FIG. 15 shows a relationship between the risk potential RP and the base steering reaction correction Fbs, where the base steering reaction correction Fbs increases as the risk potential RP increases. FIG. 16 shows a relationship between the driver's steering speed and the correction coefficient α, where the driver's steering speed is defined to be positive in a direction to increase the risk potential RP. In FIG. 16, the correction coefficient α increases as the steering speed increases in the direction to increase the risk potential RP, whereas the correction coefficient α is equal to zero when the steering speed is in the direction to reduce the risk potential RP. Specifically, when the driver operates steering wheel 5 at a steering speed in the direction to reduce the risk potential RP, the correction coefficient α is equal to zero so that the steering reaction correction Fa is equal to zero.

Subsequent to Step S210, at Step S211, controller 50 implements the normal desired steering reaction Fp with steering reaction control unit 60, namely, produces a steering reaction and conforms the same to the normal desired steering reaction Fp with steering reaction control unit 60. Subsequent to Step S211, at Step S212, controller 50 increments the count i. Subsequent to Step S212, at Step S213, controller 50 determines whether or not the count i is equal to a reference value of 10. The reference value is not limited to 10, but may be any integer larger than 2. When determining at Step S213 that the count i is not equal to 10, controller 50 returns to Step S201. On the other hand, when determining at Step S213 that the count i is equal to 10, then controller 50 proceeds to Step S214 where controller 50 resets the count i to zero, and then returns to Step S201. The foregoing process can provide the normal desired steering reaction Fp for a longer period than the provisional desired steering reaction Fs, and inform the driver of the provisional desired steering reaction Fs and normal desired steering reaction Fp distinctively. This allows driver's intention to be adequately reflected in the operation of vehicle driving operation support system 1 so as to achieve suitable control of steering reaction in conformance with driver's intention.

Figure 17:
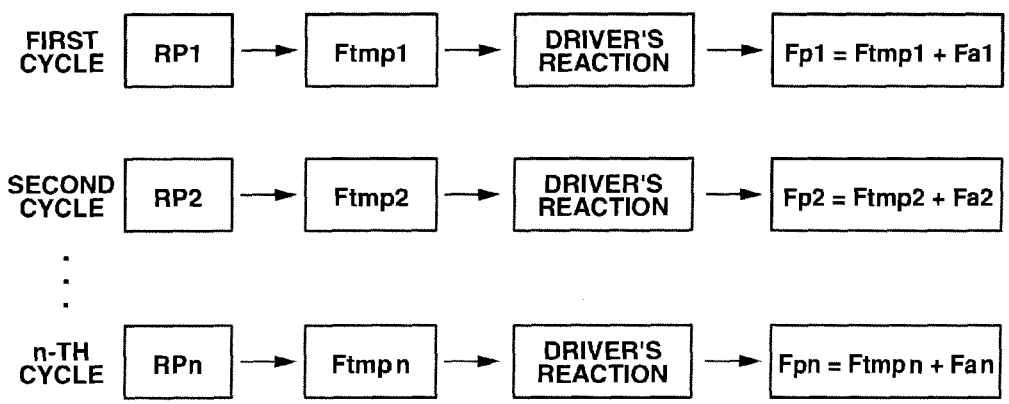
FIG. 17 is a diagram showing how a provisional desired steering reaction and a normal desired steering reaction are calculated by the process of steering operation support according to the second embodiment.
Figure 18:
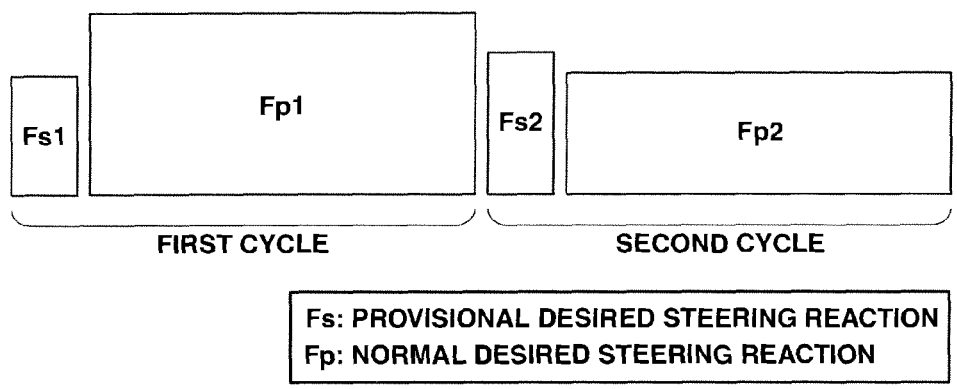
FIG. 18 is a diagram showing an example of how the steering reaction is controlled to change according to the calculation of FIG. 17.

<Operations> FIG. 17 shows how the provisional desired steering reaction Fs and normal desired steering reaction Fp are calculated by the process of steering operation support according to the second embodiment. FIG. 18 shows an example of how the steering reaction is controlled to change according to the calculation of FIG. 17. In FIGS. 17 and 18, each of the numbers given to the risk potential RP, base provisional desired steering reaction Ftmp, provisional desired steering reaction Fs, normal desired steering reaction Fp, and steering reaction correction Fa, indicates the order of a corresponding cycle of control or calculation.

As shown in FIG. 17, during the first cycle of control or calculation, a first provisional desired steering reaction value Fs1 is set to a base provisional desired steering reaction value Ftmp1 which is derived on a basis of a risk potential value RP1 from the table of base provisional desired steering reaction Ftb. The first provisional desired steering reaction value Fs1 is implemented as shown in FIG. 18. In response to measurement of driver's reaction in the form of steering operation, a first normal desired steering reaction value Fp1 is calculated by summing the first provisional desired steering reaction value Fs1 and a steering reaction correction value Fa1 (Fp1=Fs1+Fa1=Ftmp1+Fa1), and is implemented as shown in FIG. 18. The period of operation based on the first normal desired steering reaction value Fp1 is longer than that based on the first provisional desired steering reaction value Fs1.

Subsequently, during the second cycle of control, a second provisional desired steering reaction value Fs2 is set to a base provisional desired steering reaction value Ftmp2 which is derived on a basis of a risk potential value RP2 from the table of base provisional desired steering reaction Ftb. The second provisional desired steering reaction value Fs2 is implemented as shown in FIG. 18. In response to measurement of driver's reaction in the form of steering operation, a second normal desired steering reaction value Fp2 is calculated by summing the second provisional desired steering reaction value Fs2 and a steering reaction correction value Fat (Fp2=Fs2+Fa2=Ftmp2+Fa2), and is implemented as shown in FIG. 18. Vehicle driving operation support system 1 repeats the foregoing process.

According to the foregoing process of steering operation support, the provisional desired steering reaction Fs is suitably calculated on a basis of the current risk potential RP which is updated at each cycle of control or calculation on a basis of the current condition. With vehicle driving operation support system 1, the motor vehicle 1A produces a provisional steering reaction on a basis of the risk potential RP, measures driver's operation, and adds a corresponding correction to produce a normal steering reaction. In the next cycle, motor vehicle 1A produces a provisional steering reaction on the basis of the provisional desired steering reaction Fs which is set to the base provisional desired steering reaction Ftmp which is calculated based on the risk potential RP. This is effective for conforming the provisional desired steering reaction Fs to the normal desired steering reaction Fp which is calculated in consideration of driver's reaction to provisional desired steering reaction Fs. In this way, vehicle driving operation support system 1 can support or assist a driver in vehicle operation in conformance with driver's intention.

<Advantageous Effects> <1> The vehicle driving operation support apparatus, wherein: the vehicle control section (60) is configured to produce a steering reaction ($T_R$) for steering operation support; and the provisional control setpoint setting section (50) is configured to calculate the provisional setpoint (Fs) on a basis of the calculated risk potential (RP), is effective for providing a suitable provisional setpoint in conformance with the current vehicle traveling condition.

Application Example 1

The method of calculation of provisional desired steering reaction Fs and normal desired steering reaction Fp according to the second embodiment may be combined with that according to the first embodiment. For example, the method according to the second embodiment is employed when the risk potential RP is above a predetermined threshold value, and the method according to the first embodiment is employed when the risk potential RP is below the predetermined threshold value. This example is effective for providing suitable steering reaction in conformance with many different situations.

Third Embodiment

Motor vehicle 1A according to a third embodiment of the present invention differs from the first embodiment in detailed contents of steering operation support. The basic construction of motor vehicle 1A is the same as in the first embodiment.

The following describes detailed contents of steering operation support according to the third embodiment.

Figure 19:
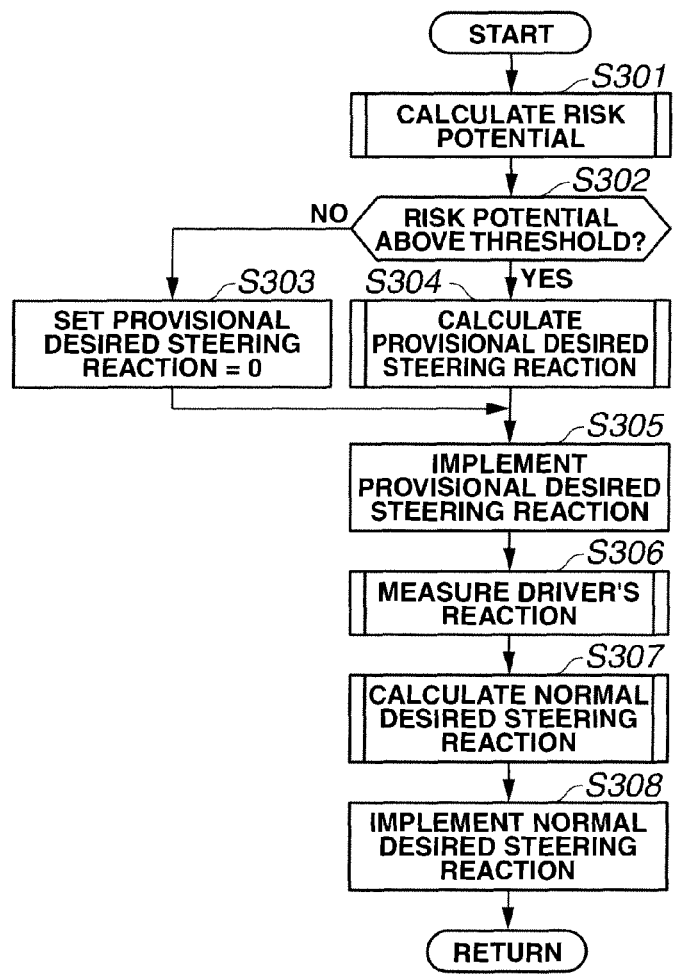
FIG. 19 is a flow chart showing a process of steering operation support according to a third embodiment of the present invention, which is performed by the controller.

<Steering Operation Support> Controller 50 performs a steering operation support function as part of the vehicle driving operation support function. FIG. 19 is a flow chart showing a process of steering operation support, which is performed by controller 50. The process is started in response to a command input by a driver for vehicle driving operation support system 1 to start the steering operation support function. One cycle of the process is executed by interruption at a predetermined interval such as of 10 ms. As shown in FIG. 19, the process is started with Step S301 where controller 50 calculates the risk potential RP.

Subsequent to Step S301, at Step S302, controller 50 determines whether or not the risk potential RP is above a predetermined threshold value RP0. When determining at Step S302 that the risk potential RP is not above the threshold value RP0, then controller 50 proceeds to Step S303 where controller 50 sets a provisional desired steering reaction Fs to zero. On the other hand, when determining at Step S302 that the risk potential RP is above the threshold value RP0, then controller 50 proceeds to Step S304 where controller 50 calculates the provisional desired steering reaction Fs. The calculation of provisional desired steering reaction Fs may be implemented by the method according to the first embodiment or the method according to the second embodiment.

Subsequent to Step S303 or S304, at Step S305, controller 50 implements the provisional desired steering reaction Fs with steering reaction control unit 60, namely, produces a steering reaction and conforms the same to the provisional desired steering reaction Fs with steering reaction control unit 60. Subsequent to Step S305, at Step S306, controller 50 senses or measures driver's reaction to the controlled steering reaction. In this example, controller 50 measures driver's steering operation in the form of steering speed under the condition that the steering reaction is produced by vehicle driving operation support system 1 for supporting or assisting the driver in operating the motor vehicle 1A.

Subsequent to Step S306, at Step S307, controller 50 calculates a normal desired steering reaction Fp on a basis of a history of the measured driver's reaction or measured steering operation in the form of steering speed. Subsequent to Step S307, at Step S308, controller 50 implements the normal desired steering reaction Fp with steering reaction control unit 60, namely, produces a steering reaction and conforms the same to the normal desired steering reaction Fp with steering reaction control unit 60. Controller 50 repeats the foregoing process.

Figure 20:
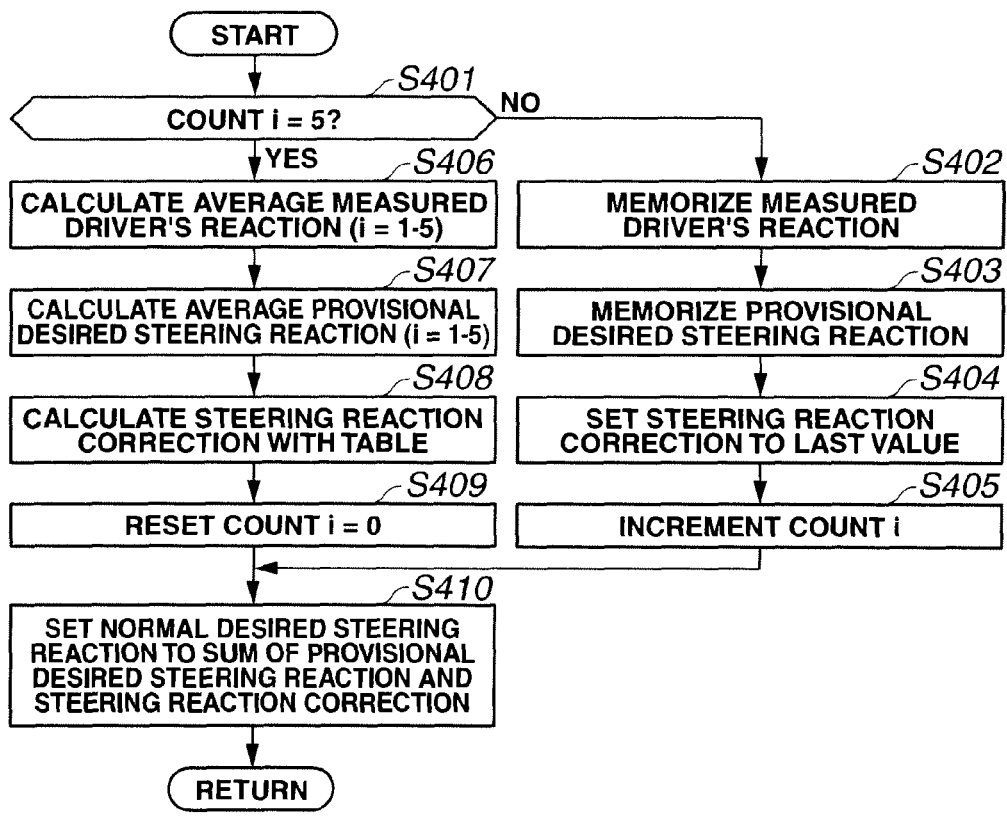
FIG. 20 is a flow chart showing a process of calculating a normal desired steering reaction during the process of steering operation support according to the third embodiment, which is performed by the controller.

<Calculation of Normal Desired Steering Reaction> The operation of Step S307 is implemented by a process according to a flow chart shown in FIG. 20 which is performed by controller 50. The process is started with Step S401 where controller 50 determines whether or not the count i is equal to a reference value of 5. This reference value is not limited to 5, but may be any integer larger than 2. The count i is initially set to an initial value of zero. When determining at Step S401 that the count i is not equal to 5, then controller 50 proceeds to Step S402 where controller 50 senses or measures driver's reaction or driver's operation or driver's steering operation (steering input) in the form of steering speed, and memorizes the same in the RAM. Subsequent to Step S402, at Step S403, controller 50 memorizes the current value of provisional desired steering reaction Fs. Subsequent to Step S403, at Step S404, controller 50 sets the steering reaction correction Fa to a value of the steering reaction correction Fa that is last calculated at Step S408. The steering reaction correction Fa is initially set to an initial value of zero. Subsequent to Step S404, at Step S405, controller 50 increments the count i (i=i+1), and then proceeds to Step S410. On the other hand, when determining at Step S401 that the count i is equal to 5, then controller 50 proceeds to Step S406 where controller 50 reads from the RAM the values of measured driver's reaction at the count i from 1 to 5, and calculates the average value of measured driver's reaction. Subsequent to Step S406, at Step S407, controller 50 reads from the RAM the values of provisional desired steering reaction Fs at the count i from 1 to 5, and calculates the average value of provisional desired steering reaction Fs. Subsequent to Step S407, at Step S408, controller 50 reads a steering reaction correction Fa on a basis of the average value of measured driver's reaction and the average value of provisional desired steering reaction Fs, using a table in which steering reaction correction Fa is defined and stored with respect to driver's reaction and provisional steering reaction.

Figure 21:
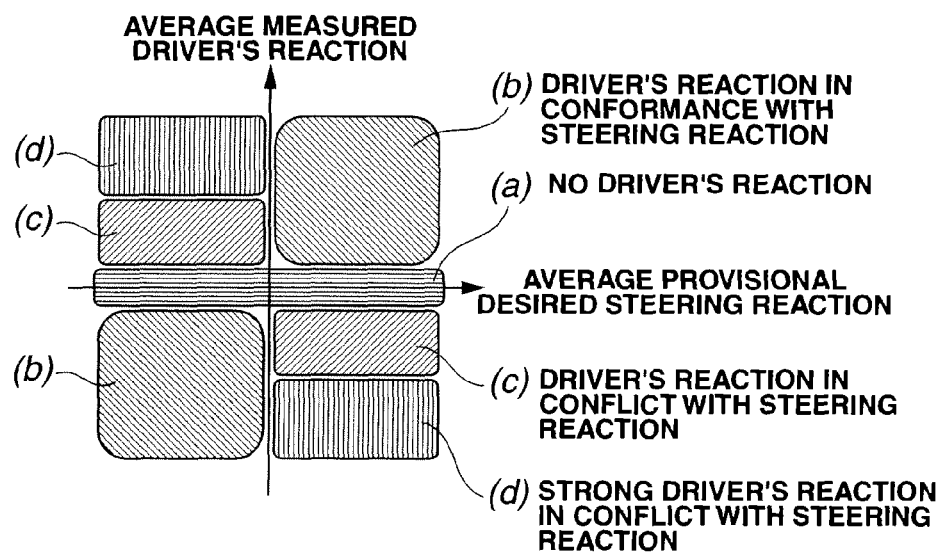
FIG. 21 is a graphic diagram showing a map in which a steering reaction correction is defined on a basis of provisional steering reaction and driver's reaction according to the third embodiment.

FIG. 21 shows a map in which steering reaction correction Fa is defined on a basis of provisional steering reaction and driver's reaction according to the third embodiment. The steering reaction correction Fa is set differently in regions (a), (b), (c) and (d) as follows. In the foregoing, $\beta1$, $\beta2$, $\beta3$ and $\beta4$ has a relationship of $\beta1 > \beta3 > \beta2 > \beta4$, specifically, $\beta1 > \beta3 > 1 > \beta2 > \beta4$ or $\beta1 > \beta3 > 0 > \beta2 > \beta4$.

In the region (a) shown in FIG. 21, it can be determined that no driver's reaction is present. In this region, the control is strengthened using the following equation, because the driver does not suitably perceive the controlled steering reaction.

(steering reaction correction $Fa$)=(current value of provisional desired steering reaction $Fs$)×(correction coefficient $\beta1$)

In the region (b) shown in FIG. 21, it can be determined that the driver suitably reacts to provisional desired steering reaction Fs. In this region, the control is weakened using the following equation, because the driver suitably perceives the controlled steering reaction.

(steering reaction correction $Fa$)=(current value of provisional desired steering reaction $Fs$)×(correction coefficient $\beta2$)

In the region (c) shown in FIG. 21, it can be determined that the driver reacts in conflict with provisional desired steering reaction Fs. In this region, the control is strengthened using the following equation, because the driver does not suitably perceive meaning of the controlled steering reaction.

(steering reaction correction $Fa$)=(current value of provisional desired steering reaction $Fs$)×(correction coefficient $\beta3$)

In the region (d) shown in FIG. 21, it can be determined that the driver strongly reacts in conflict with provisional desired steering reaction Fs. In this region, the control is weakened or overridden using the following equation, because the driver is intentionally acting against the controlled steering reaction.

(steering reaction correction $Fa$)=(current value of provisional desired steering reaction $Fs$)×(correction coefficient $\beta4$)

Subsequent to Step S408, Step S409, controller 50 resets the count i to zero. Subsequent to Step S405 or S409, Step S410, controller 50 calculates the normal desired steering reaction Fp by summing the steering reaction correction Fa read at Step S408 and the provisional desired steering reaction Fs calculated at Step S304 (Fp=Fs+Fa=Ftmp+Fa). In this way, the steering reaction correction Fa is calculated on a basis of a history of driver's reaction during the last predetermined period. This makes it possible to provide suitable steering reaction in consideration of tendency of driver's reaction.

Figure 22:
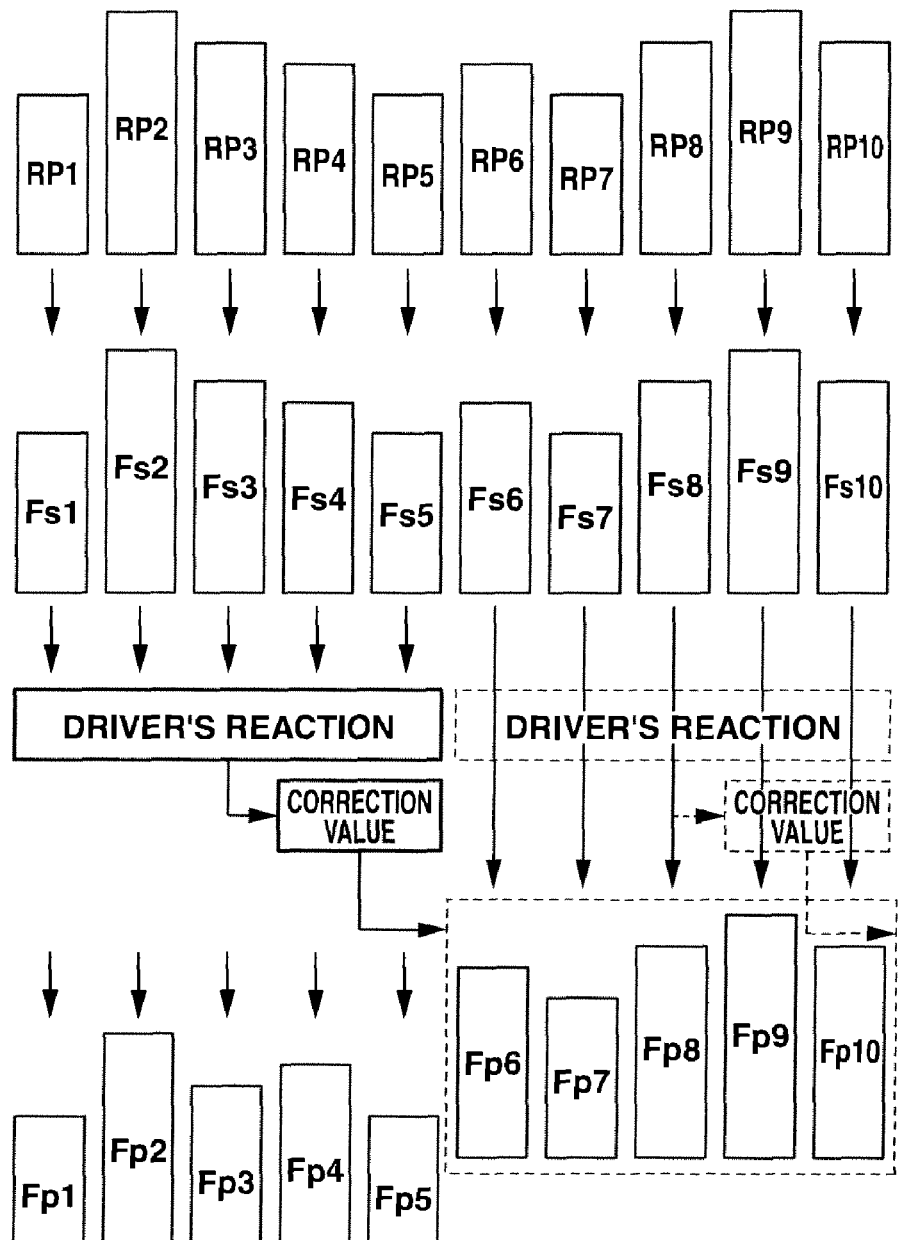
FIG. 22 is a diagram showing an example of how the steering reaction is controlled to change during the process of steering operation support according to the third embodiment.

<Operations> FIG. 22 shows an example of how the steering reaction is controlled to change during the process of steering operation support according to the third embodiment. As shown in FIG. 22, during the first to fifth cycles of control, motor vehicle 1A produces steering reaction according to the normal desired steering reaction Fp which is equal to the provisional desired steering reaction Fs, while memorizing a history of driver's reaction to the provisional desired steering reaction Fs. Then, during the sixth cycle of control, motor vehicle 1A calculates the average of the history of driver's reaction that is memorized during the first to fifth cycles of control, and calculates a new value of steering reaction correction Fa on a basis of the average driver's reaction and the average provisional desired steering reaction Fs. During the sixth to tenth cycles of control, motor vehicle 1A calculates the normal desired steering reaction Fp by adding the calculated value of steering reaction correction Fa to the provisional desired steering reaction Fs.

In this way, motor vehicle 1A can provide suitable steering reaction correction Fa to provisional desired steering reaction Fs, in consideration of driver's reaction during the last predetermined period. In this way, motor vehicle 1A according to the third embodiment memorizes a history of driver's reaction to steering reaction based on provisional desired steering reaction Fs during a preceding constant period of control. Motor vehicle 1A can provide suitable steering reaction in which the tendency of driver's reaction is reflected, and thus perform vehicle driving operation support in conformance with driver's intention. In this embodiment, controller 50 serves as a history acquiring section or means for acquiring a history of the controlling operation of the vehicle control section and the sensed driver's operation.

<Advantageous Effects> The vehicle driving operation support apparatus further comprising a history acquiring section (50) configured to acquire a history of the controlling operation of the vehicle control section (60) and the sensed driver's operation ($\theta'$), wherein the normal control setpoint setting section (50) is configured to calculate the normal setpoint (Fp) on a basis of the history, is effective for providing suitable steering reaction on which the tendency of driver's reaction operation is reflected, and thus performing vehicle driving operation support in conformance with driver's intention.

Application Example 1

In the first to third embodiments, the provisional control setpoint and the normal control setpoint are calculated for steering reaction for steering operation support, as examples. However, the same concept may be applied to pedal reaction or brake assist force for driving/braking force operation support in the longitudinal direction of the vehicle. Also in such cases, the control setpoint can be suitably set in conformance with driver's intention. Namely, vehicle driving operation support system 1 can be configured to perform suitable vehicle driving operation support in conformance with driver's intention during driving/braking force operation support in the longitudinal direction of the vehicle.

The entire contents of Japanese Patent Application 2009-046944 filed Feb. 27, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving operation support apparatus comprising:
    an environment sensing section configured to sense an environment surrounding a vehicle;
    a traveling condition sensing section configured to sense a traveling condition of the vehicle;
    a vehicle control section configured to control the vehicle on a basis of a control setpoint;
    a provisional control setpoint setting section configured to:
        calculate a risk potential of the vehicle on a basis of the sensed environment and the sensed traveling condition, and
        set on a basis of the calculated risk potential the control setpoint to a provisional setpoint effective for reducing the risk potential;
    a driver's reaction sensing section configured to sense a driver's operation in reaction to the controlling operation of the vehicle control section with the control setpoint set to the provisional setpoint; and
    a normal control setpoint setting section configured to set the control setpoint to a normal setpoint on a basis of the sensed driver's operation.

2. The vehicle driving operation support apparatus as claimed in claim 1, further comprising a driving operation support condition sensing section configured to sense a driving operation support condition of the vehicle, wherein the provisional control setpoint setting section is configured to calculate the provisional setpoint on a basis of the driving operation support condition.

3. The vehicle driving operation support apparatus as claimed in claim 1, wherein:
    the vehicle control section is configured to produce a steering reaction for steering operation support; and
    the provisional control setpoint setting section is configured to calculate the provisional setpoint on a basis of the calculated risk potential and the sensed driver's operation.

4. The vehicle driving operation support apparatus as claimed in claim 1, wherein:
    the vehicle control section is configured to produce a steering reaction for steering operation support; and
    the provisional control setpoint setting section is configured to calculate the provisional setpoint on a basis of the calculated risk potential.

5. The vehicle driving operation support apparatus as claimed in claim 1, further comprising a history acquiring section configured to acquire a history of the controlling operation of the vehicle control section and the sensed driver's operation, wherein the normal control setpoint setting section is configured to calculate the normal setpoint on a basis of the history.

6. The vehicle driving operation support apparatus as claimed in claim 1, wherein:
    the vehicle control section is configured to produce a steering reaction for steering operation support; and
    the driver's reaction sensing section is configured to sense the driver's operation in a form of steering speed in reaction to the produced steering reaction with the control setpoint set to the provisional setpoint.

7. The vehicle driving operation support apparatus as claimed in claim 1, wherein the normal control setpoint setting section is configured to obtain the normal setpoint by increasing a magnitude of the provisional setpoint, when the sensed driver's operation is in a direction to increase the risk potential.

8. The vehicle driving operation support apparatus as claimed in claim 1, wherein the control setpoint is set to the normal setpoint for a longer period than the provisional setpoint.

9. The vehicle driving operation support apparatus as claimed in claim 1, wherein the provisional control setpoint setting section is configured to calculate the risk potential on a basis of a distance to a sensed obstacle.

10. A vehicle driving operation support apparatus comprising:
    environment sensing means for sensing an environment surrounding a vehicle;
    traveling condition sensing means for sensing a traveling condition of the vehicle;
    vehicle control means for controlling the vehicle on a basis of a control setpoint;
    provisional control setpoint setting means for:
        calculating a risk potential of the vehicle on a basis of the sensed environment and the sensed traveling condition, and
        setting on a basis of the calculated risk potential the control setpoint to a provisional setpoint effective for reducing the risk potential;
    driver's reaction sensing means for sensing driver's operation in reaction to the controlling operation of the vehicle control means with the control setpoint set to the provisional setpoint; and
    normal control setpoint setting means for setting the control setpoint to a normal setpoint on a basis of the sensed driver's operation.

11. A motor vehicle comprising:
    an environment sensing section configured to sense an environment surrounding the motor vehicle;
    a traveling condition sensing section configured to sense a traveling condition of the motor vehicle;
    a vehicle control section configured to control the motor vehicle on a basis of a control setpoint;
    a provisional control setpoint setting section configured to:
        calculate a risk potential of the motor vehicle on a basis of the sensed environment and the sensed traveling condition, and
        set on a basis of the calculated risk potential the control setpoint to a provisional setpoint effective for reducing the risk potential;
    a driver's reaction sensing section configured to sense a driver's operation in reaction to the controlling operation of the vehicle control section with the control setpoint set to the provisional setpoint; and
    a normal control setpoint setting section configured to set the control setpoint to a normal setpoint on a basis of the sensed driver's operation.

12. A vehicle driving operation support method comprising:
    performing a vehicle control operation for vehicle driving operation support with a control setpoint set to a provisional setpoint;
    calculating a correction on a basis of driver's operation in reaction to the vehicle control operation with the control setpoint set to the provisional setpoint; and
    performing the vehicle control operation with the control setpoint set to a normal setpoint as a sum of the provisional setpoint and the correction.

* * * * *